United States Patent
Nishihira et al.

[11] Patent Number: 5,922,827
[45] Date of Patent: Jul. 13, 1999

[54] PROCESS FOR PRODUCING A POLYCARBONATE

[75] Inventors: Keigo Nishihira; Shuji Tanaka; Katsumasa Harada; Ryoji Sugise, all of Ube; Akinori Shiotani; Katsutoshi Washio, both of Ichihara, all of Japan

[73] Assignee: UBE Industries, Ltd., Ube, Japan

[21] Appl. No.: 08/936,666

[22] Filed: Sep. 24, 1997

[30] Foreign Application Priority Data

Sep. 27, 1996 [JP] Japan .................................. 8-256961
Sep. 27, 1996 [JP] Japan .................................. 8-256962

[51] Int. Cl.⁶ .................................................. C08G 64/00
[52] U.S. Cl. ........................................ 528/196; 560/190
[58] Field of Search .............................. 528/196; 560/190

[56] References Cited

U.S. PATENT DOCUMENTS

| 4,012,406 | 3/1977 | Buysch et al. | 528/196 |
| 4,544,507 | 10/1985 | Foley | 560/190 |
| 5,210,268 | 5/1993 | Fukuoka et al. | 558/270 |
| 5,648,510 | 7/1997 | Harada et al. | 558/274 |

FOREIGN PATENT DOCUMENTS

| 0 719 815 A2 | 7/1996 | European Pat. Off. . |
| 0 795 539 A1 | 9/1997 | European Pat. Off. . |
| 49-42621 | 4/1974 | Japan . |
| 52-43826 | 11/1977 | Japan . |
| 56-2541 | 1/1981 | Japan . |
| 56-8019 | 2/1981 | Japan . |
| 56-12624 | 3/1981 | Japan . |
| 57-47658 | 10/1982 | Japan . |
| 58-50977 | 11/1983 | Japan . |
| 3-291257 | 12/1991 | Japan . |
| 4-9358 | 1/1992 | Japan . |
| 4-211038 | 8/1992 | Japan . |
| 4-224547 | 8/1992 | Japan . |
| 4-235951 | 8/1992 | Japan . |

OTHER PUBLICATIONS

"Thermodecomposition of Diphenylesters of Dicarboxylic Acids, Second Report", Organic Synthetic Chemistry, vol. 5, Report 47, pp. 70–71 (1948).

*Primary Examiner*—Terressa Mosley
*Attorney, Agent, or Firm*—Finnegan, Henderson, Farabow, Garrett & Dunner, L.L.P.

[57] ABSTRACT

A diaryl carbonate is produced by decarbonylating a diaryl oxalate, which can be prepared by transesterification of a dialkyl oxalate with a hydroxyaryl compound, in the presence of a catalyst, while removing the resultant carbon monoxide as a by-product, and then optionally refined by an evaporation and/or distillation, and then the resultant diaryl carbonate is condensation-polymerized with a polyhydroxyl compound, while recovering a resultant hydroxyaryl compound from the reaction system, to produce a polycarbonate.

21 Claims, 6 Drawing Sheets

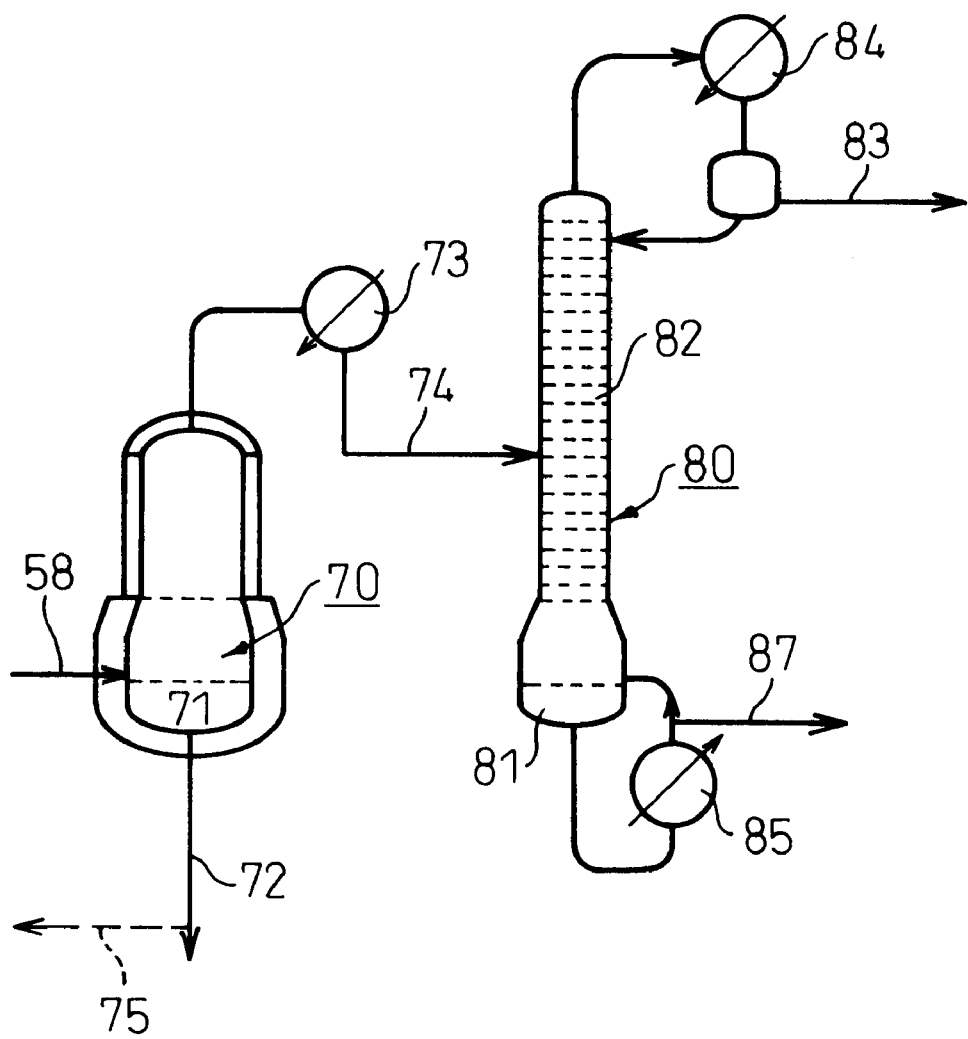

PROCESS FOR PRODUCING A POLYCARBONATE

GROUND OF THE INVENTION

1. Field of the Invention

The present invention relates to a process for producing a polycarbonate. More particularly, the present invention relates to a process for producing a polycarbonate comprising the steps of converting a diaryl oxalate to a corresponding diaryl carbonate and condensation-polymerizing the diaryl carbonate with a polyhydric hydroxyl compound, with high efficiency.

Polycarbonate resins have excellent mechanical strength, transparency and electric properties and thus are extremely important materials useful for producing various industrial material products, for example, electric and electronic articles such as compact disks, and organic glasses and lenses.

2. Description of the Related Art

It is known that a polycarbonate can be produced by condensation-polymerizing a diaryl carbonate, for example, diphenyl carbonate (DPC), which can be produced by various conventional methods, with a polyhydroxyl compound, for example, a bisphenol compound.

Also, it is known that the diaryl carbonate, which is usable as a starting material for the polycarbonates, can be produced by a method in which a dialkyl carbonate produced by a conventional synthetic method is subjected to a transesterification reaction, or a method in which the diaryl carbonate can be directly produced from phosgene and a hydroxyaryl compound, for example, a phenol compound. Also, other various methods have been proposed to produce the diaryl carbonate. However, the conventional methods are not always satisfactory for industrial application.

For example, Japanese Examined Patent Publication No. 58-50,977 discloses a process for producing a diaryl carbonate by a phosgene method. This method is disadvantageous in that the phosgene is very poisonous, the resultant diaryl carbonate includes a impurity comprising halogen compounds in a certain content, the removal of the halogen compound-containing impurity from the crude diaryl carbonate produced by the phosgene method is difficult, and the resultant polycarbonate produced from the impurity-containing diaryl carbonate is unsatisfactory in degree of polymerization and degree of transparency.

Non-phosgene methods for producing diaryl carbonate are disclosed in Japanese Unexamined Patent Publication No. 3-291,257 and No. 4-211,038 in which a dialkyl carbonate and a phenol compound are subjected to a transesterification reaction to provide diaryl carbonate, or in Japanese Unexamined Patent Publication No. 4-9,358, in which an alkylaryl carbonate is subjected to a disproportionation reaction to produce a dialkyl carbonate and diaryl carbonate.

The method utilizing the transesterification reaction of the dialkyl carbonate is disadvantageous in that since the transesterification reaction is carried out in two equilibrium reaction steps including a formation step of an alkylaryl carbonate as an intermediate and the reaction rate for producing the diaryl carbonate is slow. To solve this problem, various specific catalysts and complicated production processes and apparatuses are provided by, for example, Japanese Unexamined Patent Publication No. 4-235,951 and No. 4-224,547.

Also, the above-mentioned disproportionation method for the alkylaryl carbonate is not industrially satisfactory in that the alkylaryl carbonate is an intermediate in the above-mentioned transesterification reaction and thus is very difficult to isolate it from the transesterification reaction mixture which contains non-reacted starting compounds and other reaction products, and the alkylaryl carbonate per se is difficult to industrially produce and obtain.

Namely, the method of producing diphenyl carbonate by transesterifying dialkyl carbonate with a phenol compound is expected to be industrially realized as a typical non-phosgene method for the diaryl carbonate. However, in fact, the transesterification method is very complicated and thus is not suitable for industrial use.

On other hand, as methods of producing aryl oxalate, Japanese Examined Patent Publication No. 52-43,826 discloses a method of producing a diarylester of oxalic acid by directly esterifying oxalic acid with a phenol compound in the presence of an esterification catalyst in an organic solvent at a temperature of 100 to 130° C.; Japanese Examined Patent Publication No. 56-8,019 and Japanese Unexamined Patent Publication No. 49-42,621 disclose methods of producing aryl oxalate by reacting a dialkyl oxalate with a diaryl carbonate; and Japanese Examined Patent Publication No. 56-2,541 and Japanese Examined Patent Publication No. 57-47,658 disclose methods of producing a diaryl oxalate by transesterifying a diaryl oxalate with an aryl ester of a lower fatty acid.

The conventional method of producing a diaryl oxalate by a direct esterification of oxalic acid with a phenol compound is industrially unsatisfactory in that the reaction rate is too slow and thus a long time is necessary to complete the reaction.

Also, the conventional method of producing an aryl oxalate by reacting a dialkyl oxalate with a diaryl carbonate or an aryl ester of a lower fatty acid is not always satisfactory in that since the resultant product contains a large amount of by-products, a very complicated refining procedure is necessary to isolate the target aryl oxalate from the reaction product mixture. Therefore, the diaryl carbonate per se is not easy to industrially produce or obtain.

Further, with respect to a decarbonylation reaction of diaryl oxalate, Organic Synthetic Chemistry, Vol. 5, Report 47, 1948, "Thermodecomposition of diphenylesters of dicarboxylic acids, Second Report" states that diphenyl oxalate was thermally decomposed at high temperature into diphenyl carbonate.

In this report, diphenyl oxalate was produced only by the method in which a mixture of anhydrous oxalic acid, phenol and phosphorus oxychloride is heated. This report, however, does not teach or suggest to produce diaryl oxalate by a transesterification reaction of a dialkyl oxalate with a phenol compound.

U.S. Pat. No. 4,544,507 discloses a method of producing a carbonic acid diester by heating an oxalic acid diester in the presence of a alcoholate catalyst in a solvent at a temperature of 50 to 150° C. The U.S. patent states that when diphenyl oxalate was used as an oxalic acid diester for an embodiment of the method, the main reaction product consisted of diphenyl oxalate. Namely, in the U.S. patent, there is no statement that diphenyl carbonate was produced from diphenyl oxalate.

Also, the U.S. patent includes no description of a specific method of producing diaryl oxalate from a dialkyl oxalate and no suggestion of a method of producing diaryl oxalate by a transesterification reaction of a dialkyl oxalate with a phenol compound.

SUMMARY OF THE INVENTION

An object of the present invention is to provide a process for producing a polycarbonate with a high efficiency by producing a diaryl carbonate, for example, diphenyl carbonate, from a corresponding diaryl oxalate, without using phosgene, and condensation-polymerizing the diaryl carbonate with a polyhydroxyl compound.

Another object of the present invention is to provide a process for producing a polycarbonate, which process allows by-products produced during the process to be easily recovered and re-used.

The above-mentioned objects can be attained by the process of the present invention which comprises the steps of:

(A) subjecting a diaryl oxalate to a decarbonylation reaction in the presence of a decarbonylation catalyst to produce a diaryl carbonate and a by-product comprising carbon monoxide; and (B) condensation-polymerizing the resultant diaryl carbonate with a polyhydroxyl compound, while separating and collecting a by-product comprising a hydroxyaryl compound from the resultant reaction product mixture.

In the process of the present invention, the diaryl oxalate for the decarbonylation step (A) may be produced by transesterification of a dialkyl oxalate with a hydroxyaryl compound.

In the process of the present invention, optionally, (A-a) the diaryl carbonate mixture obtained by step (A) is refined and then (A-b) the resultant refined diaryl carbonate mixture having an increased degree of purity of diaryl carbonate is collected, and the refined, collected diaryl carbonate is supplied to step (B).

BRIEF DESCRIPTION OF THE DRAWINGS

FIG. 6 is an explanatory diagram of another embodiment of the diaryl carbonate mixture-refining step (A-a) of the process of the present invention.

DESCRIPTION OF THE PREFERRED EMBODIMENTS

The inventors of the present invention have studied how to provide a new process for producing a polycarbonate which process is free from problems of the conventional processes by which a polycarbonate is produced from a diaryl carbonate produced by conventional phosgene method or non-phosgene method. As a result it was found that a diaryl carbonate can be prepared by a decarbonylation reaction of a corresponding diaryl oxalate in an industrial scale, the diaryl carbonate can be converted, by a condensation-polymerization procedure thereof with a polyhydroxyl compound, to a polycarbonate and a by-product comprising a corresponding hydroxyaryl compound, the diaryl oxalate can be prepared by a transesterification reaction of a dialkyl oxalate with a hydroxyaryl compound, and the by-product comprising hydroxyaryl compound of the condensation-polymerization reaction can be re-used for the preparation of diaryl oxalate by the transesterification of the dialkyl oxalate therewith. The process of the present invention is based on the above-mentioned findings.

Namely, the process of the present invention comprises:

step (A) in which a diaryl oxalate is decarbonylated in the presence of a decarbonylation catalyst to provide a diaryl carbonate and a by-product comprising carbon monoxide; and step (B) in which the resultant diaryl carbonate is condensation-polymerized with a polyhydroxyl compound to produce a polycarbonate, while separating and collecting a by-product comprising a hydroxyaryl compound from the resultant polycarbonate mixture.

The diaryl oxalate for step (A) is preferably prepared by transesterifying a dialkyl oxalate with a hydroxyaryl compound. The hydroxyaryl compound may be one recovered, as a by-product of step (B), from the reaction product (polycarbonate) mixture.

Figure 1:
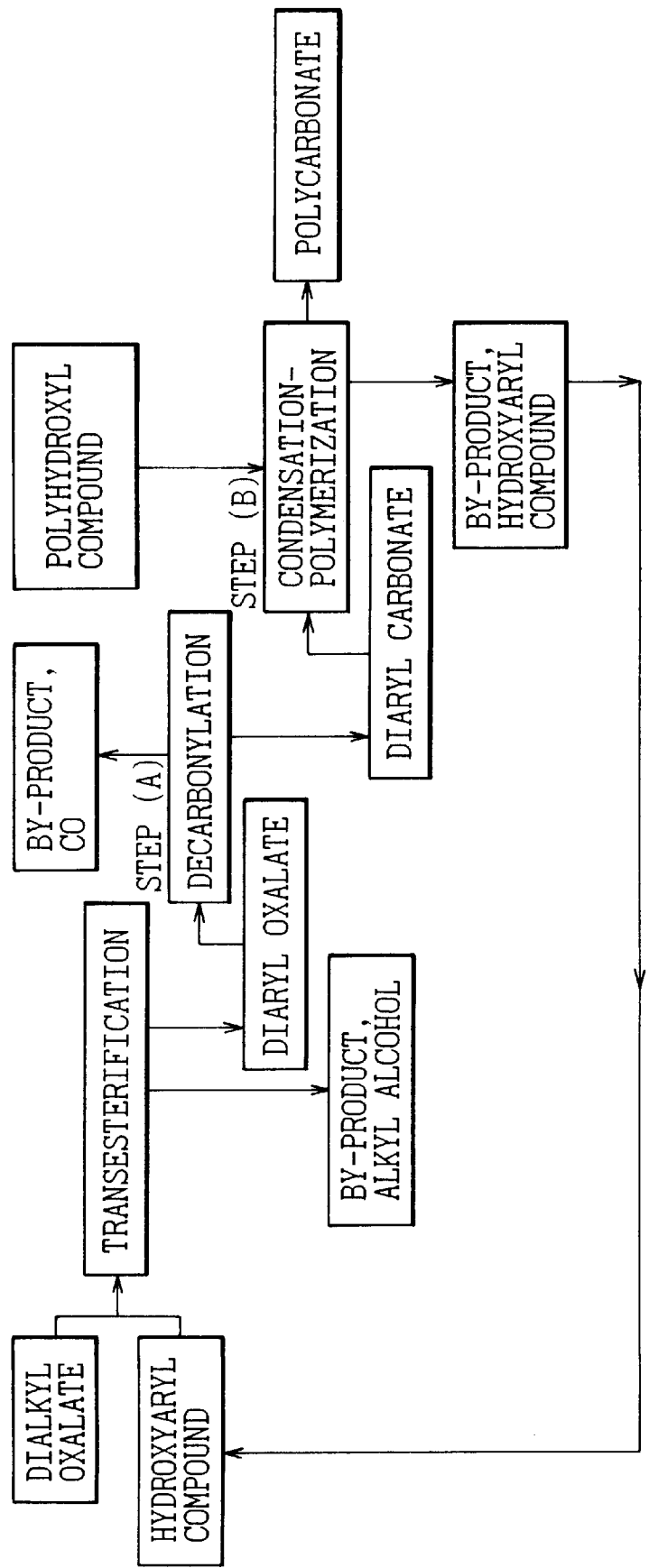
FIG. 1 is a flow sheet showing an embodiment of the process of the present invention.

FIG. 1 is a flow sheet showing an embodiment of the process of the present invention. In FIG. 1, a dialkyl oxalate, for example, dimethyl oxalate, and a hydroxyaryl compound, for example, phenol, are subjected to a transesterification procedure to produce a diaryl oxalate, for example, diphenyl oxalate and a by-product comprising an alkyl alcohol, for example, methyl alcohol. The diaryl oxalate, for example, diphenyl oxalate, is subjected to a decarbonylation step (A) to produce a diaryl carbonate, for example, diphenyl carbonate, and a by-product comprising carbon monoxide (CO). The diaryl carbonate, for example, diphenyl carbonate, is subjected together with a polyhydroxyl compound, for example, bisphenol A, to a condensation-polymerization step (B) to produce a polycarbonate and a by-product comprising a hydroxyaryl compound, for example, phenol.

In an embodiment of the process of the present invention, a diaryl oxalate, for example, diphenyl oxalate, is produced by a transesterification of a dialkyl oxalate, for example, dimethyl oxalate with a hydroxyaryl compound, for example, phenol, in the presence of a transesterification catalyst in liquid phase. The reaction product mixture comprises the resultant diaryl oxalate (for example, diphenyl oxalate) and a by-product comprising an alkyl alcohol (for example, methyl alcohol) and the diaryl oxalate is separated and recovered from the reaction product mixture, and refined. Also, the by-product is separated and recovered from the reaction product mixture.

The diaryl oxalate is subjected to a decarbonylation step (A) in the presence of a decarbonylation catalyst in liquid phase, to provide the target diaryl carbonate and a by-product comprising carbon monoxide. The diaryl carbonate is separated and recovered, while removing the by-product, carbon monoxide, in the state of a gas, from the reaction product mixture. The recovered diaryl carbonate is optionally refined.

Then, the diaryl carbonate, for example, diphenyl carbonate, is condensation-polymerized, together with a polyhydroxyl compound, for example, bisphenol A, in the presence of a polymerization catalyst, while removing a by-product comprising hydroxyaryl compound, for example, phenol.

The dialkyl oxalate usable for the production of diaryl oxalate by the transesterification is preferably selected from lower dialkyl oxalates of which each alkyl group has 1 to 6 carbon atoms, for example, dimethyl oxalate, diethyl oxalate, dipropyl oxalates, dibutyl oxalates, dipentyl oxalates and dihexyl oxalates.

The dialkyl oxalate can be prepared by reacting carbon monoxide with an alkyl nitrite (RONO, wherein R represents an alkyl group) for example, methyl nitrite in the presence of a platinum group metal-containing catalyst in gas phase in accordance with the following reaction shown by the formula (1):.

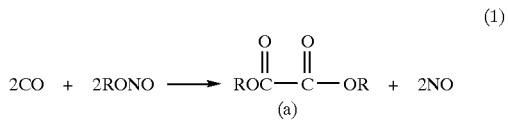

(1)

In this reaction (1), a dialkyl oxalate (a) is produced together with a by-product comprising nitrogen monoxide. Optionally, the nitrogen monoxide produced as a by-product is preferably re-used for a synthesis of the alkyl nitrite by a reaction of nitrogen monoxide with a lower alkyl alcohol in the presence of molecular oxygen. The alkyl nitrite is used for the synthesis of the dialkyl oxalate by the above-mentioned reaction (1).

In the alkyl nitrites of the formula RONO usable for the reaction (1), the alkyl group preferably has 1 to 6 carbon atoms, and is selected from for example, methyl, ethyl, n-propyl, isopropyl, and n-butyl groups. The alkyl nitrites preferably have 1 to 4 carbon atoms and include, for example, methyl nitrite, ethyl nitrite, n-propyl nitrite, isopropyl nitrite, n-butyl nitrite and isobutyl nitrite.

The synthesis of dialkyl oxalate can be carried out by the methods, for example, as disclosed in Japanese Examined Patent Publication No. 56-12,624. In the methods, carbon monoxide is reacted with an alkyl nitrite in liquid or gas phase in the presence of a platinum group metal-containing catalyst at a temperature of 10 to 200° C., preferably 20 to 150° C., under a pressure of 2 to 500 atmospheres in liquid phase reaction, or 2 to 200 atmospheres in a gas phase reaction. The synthesis can be carried out in a batch type procedure or a continuous procedure. The continuous synthesis is industrially preferable, because the heat generated during the reaction can be easily removed.

The alkyl nitrite is usually employed in an amount of 2% by weight or more, preferably 5 to 60% by weight, more preferably 10 to 50% by weight in the liquid phase reaction or 1 to 30% by volume, preferably 5 to 20% by volume, in the gas phase reaction, based on the total amount of the reaction mixture.

Carbon monoxide usable for the reaction with the alkyl nitrite may be pure or may be diluted with an inert gas. In the diluted gas, carbon monoxide preferably has a partial pressure of 5 to 200 atmospheres in the liquid phase reaction. The carbon monoxide produced as a by-product in the decarbonylation step (A) of the process of the present invention can be utilized for the synthesis of the dialkyl oxalate.

The platinum group metal catalyst usable for the synthesis of the dialkyl oxalate preferably comprises at least one member selected from platinum group metals, for example, metallic platinum and palladium, platinum group metal salts including mineral acid salts, for example, nitrates and phosphates, of palladium, halides, for example, chlorides of palladium and organic acid salts, for example, acetates, oxalates and benzoates, of palladium, and complexes of the platinum group metals, for example, palladium alkylphosphine complexes and palladium arylphosphine complexes. The platinum group metal catalyst is preferably carried on an inert carrier comprising, for example, activated carbon, alumina (for example, γ-alumina and α-alumina), spinel, silica, diatomaceous earth, pumice, zeolite and molecular sieves.

The above-mentioned platinum group metal catalyst is preferably used in an amount of 0.1 ppm to 2% by weight, more preferably 1 to 500 ppm in terms of platinum group metal, based on the total reaction mixture in the liquid phase reaction, or 0.01 to 5% by weight, in terms of platinum group metal, based on the weight of the carrier in the gas phase reaction.

The synthesis of the dialkyl oxalate may be carried out without using solvent or in a solvent non-reactive to the synthesis reaction, for example, an aliphatic or aromatic dicarboxylic acid diester, a dialkyl carbonate, an ether compound or an aromatic or an aliphatic hydrocarbon or a halide thereof.

The preparation of diaryl oxalate is carried out by transesterification reactions in accordance with the reaction formulae (2), (3) and (4) as shown below.

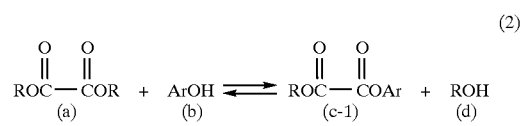

(2)

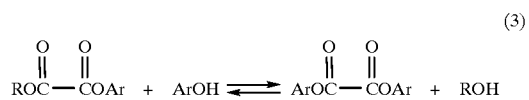

(3)

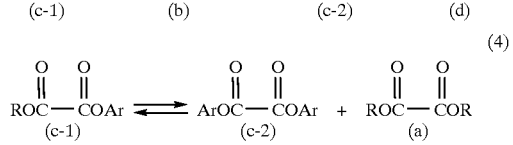

(4)

When a dialkyl oxalate (a) and a hydroxyaryl compound (b) are reacted with each other, the dialkyl oxalate (a) is transesterified with a hydroxyaryl compound (b) in accordance with reaction (2) to mainly produce an alkylaryl oxalate (C-1) and an alkyl alcohol (d), and then the alkylaryl oxalate (C-1) is transesterified with the hydroxyaryl compound (b) In accordance with reaction (3) to mainly produce a diaryl oxalate (C-2) and an alkyl alcohol (d). Also, the alkylaryl oxalate (C-1) is disproportionated in accordance with reaction (4) to mainly produce a diaryl oxalate (C-2) and a dialkyl oxalate (a). The reactions (2) to (4) are preferably carried out in a liquid phase. All of reactions (2) to (4) are equilibrium reactions.

In reactions (2) to (4), R represents an alkyl group having 1 to 6 carbon atoms, Ar represents a phenyl group which may be substituted with at least one selected from alkyl groups having 1 to 6 carbon atoms, alkoxy groups having 1 to 6 carbon atoms, halogen atoms and others. The alkyl groups having 1 to 6 carbon atoms for R and Ar include methyl, ethyl, propyl and butyl groups. The alkoxy groups for Ar include methoxy, ethoxy, propoxy, and butoxy groups. The halogen atoms include chlorine, bromine, iodine and fluorine atoms.

In the preparation of the diaryl oxalate from the dialkyl oxalate and the hydroxyaryl compound, all of reactions (2) to (4) occur.

However, principally, the alkylaryl oxalate (C-1) and the lower alkyl alcohol (d) are produced by the transesterification reaction (2), and then the diaryl oxalate (C-2) and the dialkyl oxalate (a) are produced by the disproportionation reaction (4).

In the diaryl oxalate-preparation step, a dialkyl oxalate, for example, dimethyl oxalate, and a hydroxyaryl compound, for example, phenol, are subjected to a transesterification reaction in the presence of a transesterification catalyst in the liquid phase, while removing the resultant by-product comprising a lower alkyl alcohol to the outside of the reaction system, to provide a diaryl oxalate, for example, diphenyl oxalate. The resultant diaryl oxalate is separated and recovered from the reaction product mixture and refined.

The resultant reaction product mixture for the diaryl oxalate-preparing transesterification reaction mainly comprises the non-reacted starting compounds, catalyst, intermediate compounds such as alkylaryl oxalate (for example, methylphenyl oxalate), a resultant target diaryl oxalate and a resultant by-product comprising a lower alkyl alcohol (for example, methyl alcohol) and a dialkyl oxalate (for example, dimethyl oxalate).

The by-products other than the above-mentioned compounds are in very small amounts. Therefore, the target diaryl oxalate can be separated and recovered from the reaction product mixture by a conventional refining means, for example, a distillation.

Figure 2:
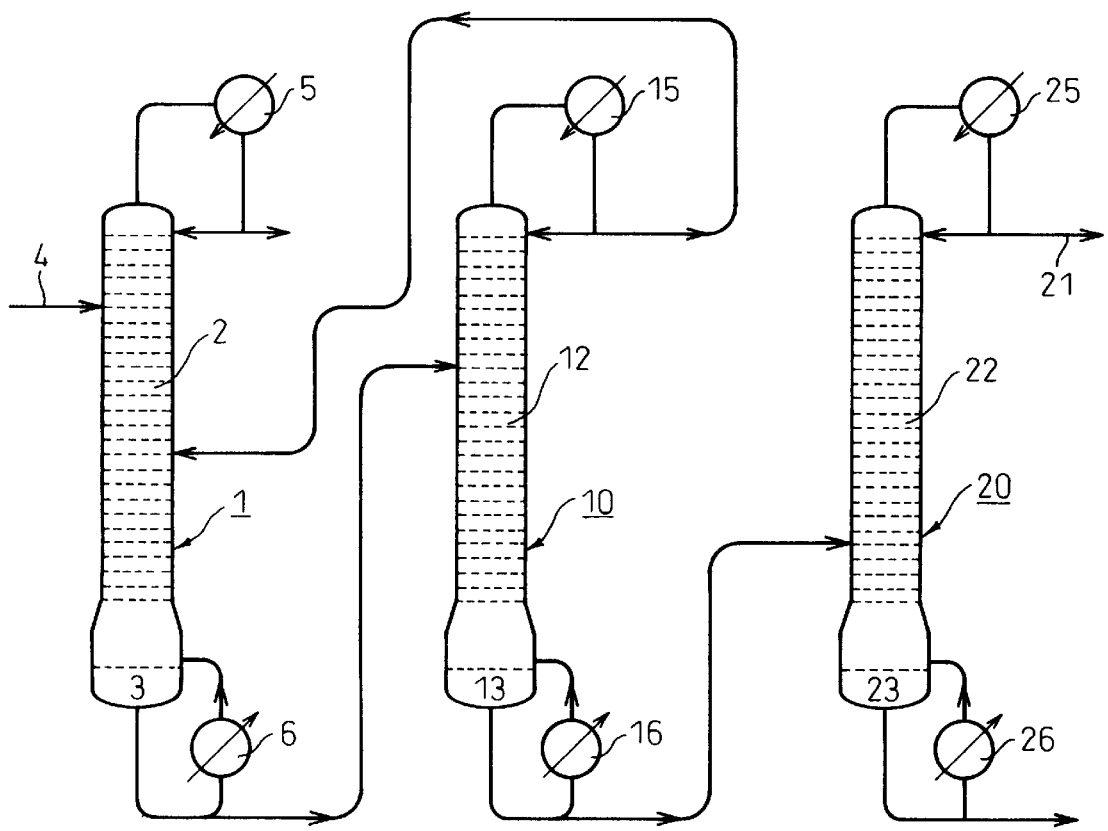
FIG. 2 is an explanatory diagram of an embodiment of procedures for producing a diaryl oxalate usable for the process of the present invention.
Figure 3:
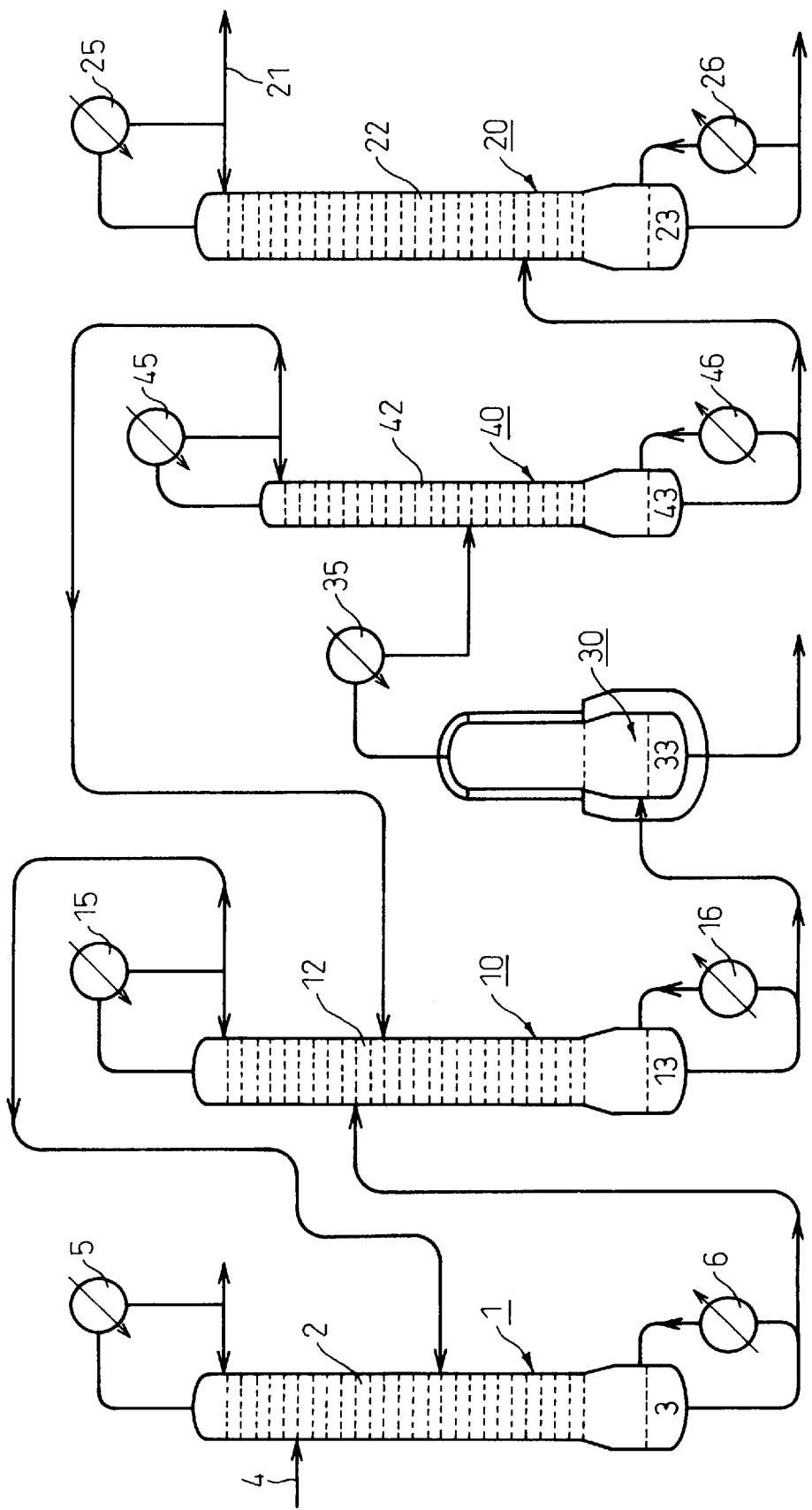
FIG. 3 is an explanatory diagram of another embodiment of procedures for producing a diaryl oxalate usable for the process of the present invention.

The preparation of the diaryl oxalate from the dialkyl oxalate and the hydroxyaryl compound can be carried out by the procedures, for example, as shown in FIGS. 2 and 3.

Referring to FIGS. 2 and 3, a diaryl oxalate, a hydroxyaryl compound (phenol compound) and a transesterification catalyst are fed into a first distillation reactor (reactive distillation column) 1 through a conduit 4. In the first distillation reactor 1, the dialkyl oxalate is transesterified with the hydroxyaryl compound in the presence of the catalyst, a fraction comprising an alkyl alcohol as a by product is vaporized and withdrawn from the first reactor 1 through a top of the reactor 1, and a liquid fraction accumulated in the bottom 3 of the reactor 1 and containing a resultant alkylaryl oxalate and the catalyst is withdrawn and fed into a second distillation reactor (reactive distillation column) 10. In the second reactor 10, the alkylaryl oxalate is mainly disproportionated in the presence of the catalyst to produce a diaryl oxalate while vaporizing and withdrawing a resultant fraction containing the resultant and non-reacted dialkyl oxalate and the non-reacted hydroxyaryl compound through the top of the second reactor 10.

The liquid fraction accumulated in the bottom 13 of the second reactor 10 and containing the diaryl oxalate is withdrawn and fed into a distillation column 20 or an evaporator 30. In the column 20, the diaryl oxalate in the liquid fraction is refined by a distillation treatment, and the refined diaryl oxalate-containing liquid fraction accumulated in the bottom 23 of the column 20 is collected. Also, a vapor fraction generated in the column 20 is withdrawn through the top of the column 20. Alternatively, the liquid fraction withdrawn from the first reactor 1 is fed into a precipitation procedure in which the diaryl oxalate is reacted with a phenol compound to form a crystalline adduct (for example, a crystalline adduct of one mole of a diphenyl oxalate with two moles of phenol), the crystalline adduct is collected from the liquid fraction and subjected to an evaporation treatment by which the phenol compound is evaporated away from the crystalline adduct and thus a refined diaryl oxalate is collected.

Alternatively, the liquid fraction recovered from the bottom of the second reactor 10 can be refined by an evaporator 30, a first distillation column 40 and a second distillation column 20 as shown in FIG. 3.

In the evaporator 30, a vaporizable portion of the liquid fraction is evaporated so as to keep the catalyst in the bottom 33 of the evaporator 30. The evaporated portion is withdrawn from the evaporator 30 through the top thereof and fed into the first distillation column 40. In the column 40, a resultant vapor fraction containing the alkylaryl oxalate and the hydroxyaryl compound (phenol compound) is withdrawn through the top of the column 40 and condensed, and the resultant liquid fraction containing, as a principal component, the diaryl oxalate, and accumulated in the bottom 43, is withdrawn and fed into the second distillation column 20. In the second distillation column 20, a resultant vapor fraction containing the diaryl oxalate is withdrawn through the top of the column 20 and collected through a conduit 21.

In the apparatus of FIG. 3, the evaporator 30 may be omitted. In this case, the liquid fraction recovered from the bottom of the second distillation reactor 10 is fed into the first distillation column and distilled to separate a vapor fraction comprising the alkylaryl oxalate and the hydroxyaryl compound from a liquid fraction comprising the diaryl oxalate and the catalyst. The vapor fraction is withdrawn from the top of the first distillation column and the liquid fraction accumulated in the bottom of the first distillation column is withdrawn and fed into the second distillation column. In the second distillation column, the fed liquid fraction is distilled to separate a vapor fraction comprising, as a principal component, the diaryl oxalate, from a liquid fraction containing the catalyst. The vapor fraction comprising the diaryl oxalate is collected through the top of the second distillation column and recovered through a conduit. The liquid fraction is discharged from the bottom of the second distillation column.

Referring to FIGS. 2 and 3, the vapor fraction withdrawn through the top of the first distillation reactor 1 may be recovered or condensed by a cooler 5 and returned to the top of the first distillation reactor 1, and the liquid fraction accumulated in the bottom 3 of the first distillation reactor 1 may be circulated through a heater 6 to control the temperature of the liquid fraction to a desired level.

In FIGS. 2 and 3, a portion of the vapor fraction withdrawn through the top of the second distillation reactor 10 may be recycled into a middle portion of the first distillation reactor 1 and the remaining portion may be condensed by a cooler 15 and returned to the top of the second distillation reactor 1, and the liquid fraction accumulated in the bottom 13 of the first distillation reactor 10 may be circulated through a heater 16 to control the temperature of the liquid fraction to a desired level.

In FIG. 2, a portion of the vapor fraction withdrawn through the top of the distillation column 20 may be condensed by a cooler 25 and returned into the top portion of the column 20, and the liquid fraction accumulated in the bottom 23 of the column 20 may be circulated through a heater 26 to maintain the temperature thereof at a desired level.

Referring to FIG. 3, the vapor fraction withdrawn from the top portion of the evaporator 30 may be cooled and condensed by a cooler 35 and then fed into the first distillation column 40, a portion of vapor fraction withdrawn from the top portion of the first distillation column 40 may be condensed by a cooler 45 and returned to the top portion of the column 40 and the remaining portion of the vapor fraction may be recycled to a middle portion of the second distillation reactor 10, the liquid fraction accumulated in the bottom 43 of the column 40 may be circulated through a heater 46 and heated to a desired temperature, a portion the vapor fraction withdrawn from the top portion of the second distillation column 20 may be condensed by a cooler 25 and returned into the top portion of the column 20 and the remaining portion of the vapor fraction may be collected, and the liquid fraction accumulated in the bottom 23 of the column 20 may be circulated through a heater 26 and heated to a desired temperature.

In FIGS. 2 and 3, each of the first distillation reactor 1 and the second distillation reactor 10 is preferably a distillation column having a plurality of trays 2 and 12 or a distillation column having a packing layer located at a upper portion thereof and packed with a packing material. For example, the reactors 1 and 10 are multi-step distillation columns preferably having a theoretical number of plates of 2 or more, more preferably 5 to 100, still more preferably 7 to 50.

As a multi-step distillation column type reactor, multi-tray type distillation columns provided with bubble cap trays, sieve trays or valve trays and packing type distillation columns in which various packings, for example, Raschig rings, lesching rings or poll rings, are packed can be employed. The distillation reactors may have both the trays and the packings.

In the preparation of the diaryl oxalate, preferably a dialkyl oxalate, a hydroxyaryl compound and a transesterification catalyst are fed separately or altogether into an upper portion of the first distillation reactor 1 having a plurality of trays 2 (or packings) to transesterify the diaryl oxalate with the hydroxyaryl compound. Also, a liquid fraction withdrawn from the bottom portion 3 of the first reactor 1 is preferably fed into an upper portion of the second distillation reactor 2 having a plurality of trays 12 (or packings) to disproportionate the alkylaryl oxalate contained in the fed liquid fraction into a diaryl oxalate and a dialkyl oxalate.

The transesterification catalyst usable for the preparation of the diaryl oxalate from the dialkyl oxalate and the hydroxyaryl compound preferably comprises at least one transesterification-catalytic compound selected from, for example, compounds and complexes of alkali metals, compounds and complexes of cadmium and zirconium, lead-containing compounds, iron-containing compounds, copper-group metal compounds, zinc-containing compounds, organic tin compounds, and Lewis acid compounds of aluminum, titanium and vanadium.

The above-mentioned compounds and complexes of alkali metals, cadmium and zirconium include lithium carbonate, sodium carbonate, potassium carbonate, dibutylaminolithium, lithium diacetylacetonate chelate, cadmium diacetylacetonate chelate, zirconium diacetylacetonate chelate and zirconocene.

The above-mentioned lead-containing compounds include lead sulfides, lead hydroxides, plumbates such as calcium plumbate, lead carbonates and basic salts thereof, organic acid salts of lead and carbonate salts or basic salts thereof, alkyl or aryl lead compounds, for example, tetrabutyl lead, tetraphenyl lead, tributyl lead halogens, triphenyl lead bromine and triphenyl lead, and alkoxy or aryloxy lead compounds, for example, dimethoxylead, methoxyphenoxylead and diphenoxylead.

The above-mentioned copper group metal compounds include copper compounds including copper salts of organic acids, for example, copper acetate, copper diacetylacetonate chelate, and copper oleate, alkylcopper compounds, for example, butyl copper, alkoxycopper compounds, for example, dimethoxycopper, and copper halides, and silver compounds including silver nitrate, silver bromide, and silver picrate. Also, the above-mentioned iron-containing compounds include iron hydroxides, iron carbonates, triacetoxyiron, trimethoxyiron and triphenoxyiron. Further, the zinc-containing compounds include zinc diacetylacetonate chelate, diacetoxyzinc, dimethoxyzinc, diethoxyzinc and diphenoxyzinc.

The above-mentioned organic tin compounds include, for example, $(Ph)_4Sn$, $Sn(OCOCH_3)_4$, $(MeO)_4Sn$, $(EtO)_4Sn$, $(PhO)4Sn$, $(Me)_3SnOCOCH_3$, $(Et)_3Sn(OCOCH_3)$, $(Bu)_3Sn(OCOSH_3)$, $(Et)_3Sn(OPh)$, $(Me)_3SnOCOPh$, $(Ph)_3Sn(OMe)$, $(Ph)_3SnOCOCH_3$, $(Bu)_2Sn(OCOCH_3)_2$, $(Bu)_2Sn(OMe)_2$, $(Bu)_2Sn(OEt)_2$, $(Bu)_2Sn(OPh)_2$, $(Bu)_2SnCl_2$, $(Ph)_2Sn(OMe)_2$, $(Bu)_2SnO$, $BuSnO(OH)$, $(Et)_3SnOH$ and $(Ph)_3SnOH$.

The above-mentioned Lewis acid compounds of aluminum include, for example, $Al(X)_3$, $Al(OCOCH_3)_3$, $Al(OMe)_3$, $Al(OEt)_3$, $Al(OBu)_3$ and $Al(OPh)_3$. The above-mentioned Lewis acid compounds of titanium include, for example, $Ti(X)_3$, $Ti(OCOCH_3)_3$, $Ti(OMe)_3$, $Ti(OEt)_3$, $Ti(OBu)_3$, $Ti(OPh)_3$, $Ti(X)_4$, $Ti(OCOCH_3)_4$, $Ti(OMe)_4$, $Ti(OEt)_4$, $Ti(OBu)_4$ and $Ti(OPh)_4$. The above-mentioned Lewis acid compounds of vanadium include for example, $VO(X)_3$, $VO(OCOCH_3)_3$, $VO(OMe)_3$, $VO(OEt)_3$, $VO(OPh)_3$ and $V(X)_5$. In the chemical formulae, $COCH_3$ represents a acetyl group, Me represents a methyl group, Et represents an ethyl group, Bu represents a butyl group, Ph represents a phenyl group and X represents a halogen atom.

Among the transesterification catalysts usable for the preparation of the diaryl oxalate, the use of lithium compounds and complexes thereof, zirconium complexes, lead-containing compounds, organic tin compounds, and titanium Lewis acid compounds are particularly preferred, especially the use of the organic tin compounds, and titanium Lewis acid compounds are more preferred.

When the transesterification reaction for the preparation of the diaryl oxalate is carried out while a reaction mixture in the state of a liquid flows downward in the distillation reactor 1 or 10, the reaction temperature is preferably equal to or higher than the melting temperature of the reaction mixture containing the starting compounds and the reaction products, and lower than the thermal decomposition temperatures of the reaction products, namely, a resultant alkylaryl oxalate and diaryl oxalate. Usually, the transesterification temperature for the preparation of the diaryl oxalate is preferably about 50 to about 300° C., more preferably 100 to 250° C., still more preferably 120 to 230° C.

The transesterification reaction pressure for the preparation of the diaryl oxalate may be any of a reduced pressure, the ambient atmospheric pressure and an increased pressure. Preferably, the transesterification temperature and pressure enable the by-product comprising a lower alkyl alcohol (in the first reactor 1) and a dialkyl oxalate (in the second reactor 10) to be evaporated. Usually, when the temperature is about 50 to about 300° C., the pressure is preferably 0.01 mmHg to 100 $kg/cm^2$, more preferably 0.01 mmHg to 50 $kg/cm^2$.

The reaction time of the transesterification for the preparation of the diaryl oxalate (which corresponds to a residence time of the reaction mixture liquid in the distillation reactor 1 or 10 when the distillation reactor consists of a multi-step distillation column) is variable depending on the reaction conditions, type and operational conditions of the distillation reactor. Usually, when the reaction temperature is about 50 to about 300° C., the reaction time is preferably about 0.01 to about 50 hours, more preferably 0.02 to 10 hours, still more preferably 0.05 to 5 hours.

In the above mentioned transesterification reaction for the preparation of the diaryl oxalate, the molar ratio of the hydroxyaryl compound to the dialkyl oxalate to be used is variable in response to the type and amount of the catalyst and the reaction conditions. The molar ratio of the hydroxyaryl compound to the dialkyl oxalate contained in the feed materials is preferably 0.01:1 to 1000:1, more preferably 0.1:1 to 100:1, still more preferably 0.5:1 to 20:1.

The amount of the catalyst to be used for the transesterification reaction is variable depending on the type of the catalyst, the type and the size of the reaction apparatus, type of each material, composition of the feed material, and reaction conditions of the transesterification reaction. The transesterification catalyst is used preferably in an amount of about 0.0001 to 50% by weight, more preferably 0.001 to 30% by weight, still more preferably 0.005 to 10% by weight, based on the total weight of the dialkyl oxalate and the hydroxyaryl compound.

The diaryl oxalate prepared by the above-mentioned specific transesterification procedures has a significantly high degree of purity and contains a significantly decreased content of impurity which may affect on the condensation-polymerization of the diaryl carbonate. Therefore, the diaryl carbonate produced by step (A) has a very low content of impurity.

In the step (A) of the process of the present invention, in accordance with reaction (5) shown below, a diaryl oxalate (C-2) is decarbonylated optionally in the presence of a decarbonylation catalyst to prepare a corresponding diaryl carbonate (e) and carbon monoxide (in the gas phase).

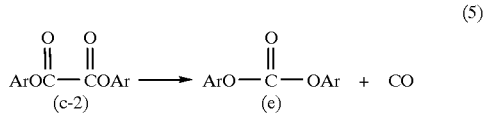

(5)

In reaction (5), R and Ar are the same as in reaction (2) to (4) mentioned above.

In step (A) of the process of the present invention, preferably, a diaryl oxalate is subjected to a decarbonylation reaction in the presence of a catalyst comprising at least one organic phosphorus compound, to produce a corresponding diaryl carbonate and carbon monoxide, the diaryl carbonate is separated and recovered from the reaction mixture and carbon monoxide in a gas phase is discharged to the outside of the reaction system.

The catalyst usable for the decarbonylation step (A) is preferably selected from catalysts enabling the decarbonylating reaction of the diaryl oxalate to be carried out at a relatively low temperature of, for example, about 100 to about 350° C., and the diaryl carbonate to be obtained at a high selectivity of 60 molar % to 100 molar %. For example, the organic phosphorus compounds having at least one carbon-phosphorus bond are usable for the decarbonylation catalyst. This type of organic phosphorus compound is preferably selected from organic phosphine compounds of the general formula (w), organic phosphine oxide compounds of the general formula (x), organic phosphine dihalide compounds of the general formula (y) and organic phosphonium salt compounds of the general formula (z).

(w)

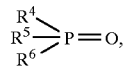

(x)

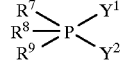

(y)

-continued
and

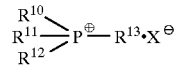

(z)

In the above general formulae (w), (x), (y) and (z), $R^1$ to $R^{13}$ represent respectively and independently from each other a member selected from the group consisting of a hydrogen atom, alkyl groups having 1 to 16 carbon atoms, aryl groups having 6 to 20 carbon atoms, substituted aryl groups, aralkyl group having 7 to 25 carbon atoms, and substituted aralkyl groups, provided that at least one of $R^1$, $R^2$ and $R^3$, at least one of $R^4$, $R^5$ and $R^6$, at least one of $R^7$, $R^8$ and $R^9$ and at least one of $R^{10}$, $R^{11}$, and $R^{12}$ and $R^{13}$ are not a hydrogen atom, X represents an anionic atom or atomic group, and $y^1$ and $Y^2$ represent respectively and independently from each other a halogen atom, for example, chlorine, bromine or iodine atom.

The substituted aryl groups have at least one substituent directly attached to a carbon atom located in the aryl ring structure. Also, the substituted aralkyl groups have at least one alkyl moiety and at least one substituent, other than the alkyl group, directly attached to a carbon atom located in the aryl ring structure.

The substituent For the substituted aryl groups and the substituted aralkyl groups is preferably selected from the group consisting of halogen atoms, for example, fluorine, chlorine and bromine atoms, a nitro group, alkyl groups having 1 to 20 carbon atoms, and alkoxy group having 1 to 15 carbon atoms.

Two of $R^1$ to $R^3$, two of $R^4$ to $R^6$, two of $R^7$ to $R^9$ and two of $R^{10}$ to $R^{13}$ may be connected or cross-linked to each other.

In the organic phosphorus compounds of the formulae (w) to (z), the alkyl groups represented by $R^1$ to $R^{13}$ and having 1 to 16 carbon atoms include methyl, ethyl, n-propyl, isopropyl, n-butyl, isobutyl, n-pentyl, n-hexyl, n-heptyl, and n-octyl groups, the aryl groups represented by $R^1$ to $R^{13}$ and having 6 to 20 carbon atoms include phenyl and naphthyl, the substituted aryl groups represented by $R^1$ to $R^{13}$ include methylphenyl, ethylphenyl, propylphenyl, methoxyphenyl, ethoxyphenyl, propoxyphenyl, chlorophenyl, fluorophenyl, methylnaphthyl, methoxynaphthyl, nitronaphthyl and chloronaphthyl groups, and the aralkyl groups represented $R^1$ to $R^{13}$ and having 7 to 25 carbon atoms include benzyl, phenethyl, p-methylbenzyl, p-methoxybenzyl and p-methylphenethyl.

In the phosphine compounds of the formula (w), preferably all of $R^1$ to $R^3$ are the aryl or substituted aryl groups as defined above. However, in the phosphine compounds, one or two, preferably two, of $R^1$ to $R^3$ may be the aryl or substituted aryl groups and the remaining (s) may be an alkyl, aralkyl or substituted aralkyl group.

The phosphine compounds of the formula (w) in which all of $R^1$ to $R^3$ are the aryl or substituted aryl groups are preferably selected from triphenylphosphine, tris (4-chlorophenyl) phosphine, tris (4-tolyl) phosphine, and α-naphthyl-(phenyl)-4-methoxyphenylphosphine.

The phosphine compounds of the formula (w) in which one or two of $R^1$ to $R^3$ are the aryl or substituted aryl groups and the remaining(s) is an alkyl, aralkyl or substituted aralkyl group, are selected from, for example, methyldiphenylphosphine, phenyl(p-methoxyphenyl) methylphosphine, ethyl(phenyl)-n-propylphosphine and dimethylphenylphosphine.

In the phosphine oxide compounds of the formula (x), all of $R^4$ to $R^6$ are preferably the aryl or substituted aryl groups.

However, one or two of $R^4$ to $R^6$ may be the aryl or substituted aryl groups and the other two or one may the alkyl, aralkyl or substituted aralkyl group.

The phosphine oxide compounds of the formula (x) in which all of $R^4$ to $R^6$ are the aryl or substituted aryl groups, are preferably selected from triphenyl-phosphine oxide, tris (4-chlorophenyl) phosphine oxide, tris (4-tolyl) phosphine oxide and α-naphthyl(phenyl)-4-methyoxyphenylphosphine oxide.

The phosphine oxide compounds of the formula (x), having one or two aryl or substituted aryl groups and two or one alkyl, aralkyl or substituted aralkyl group are preferably selected from methyldiphenylphosphine oxide, phenyl(p-methoxyphenyl)-methylphospline oxide, ethyl(phenyl)-n-propylphosphine oxide, and phenyl(p-methyoxy-phenyl) methylphosphine oxide.

Among the phosphine dihalide compounds of the formula (y), it is preferable that all of $R^7$ to $R^9$ are the aryl or substituted aryl groups. However, one or two of $R^7$ and $R^9$ may be the aryl or substituted aryl groups and the other two or one of $R^7$ to $R^9$ may be the alkyl, aralkyl or substituted aralkyl group.

Also, in the formula (y), $Y^1$ and $Y^2$ may be the same as or different from each other and represent respectively a chlorine, bromine or iodine atom.

The phosphine dihalide compounds of the formula (y) in which all of $R^7$ to $R^9$ are the aryl or substituted aryl groups as defined above are preferably selected from triphenylphosphine dichloride, triphenylphosphine dibromide, triphenylphosphine diiodide.

In the phosphonium compounds of the formula (z), it is preferable that all of $R^{10}$ to $R^{13}$ are the aryl or substituted aryl groups, and $X^-$ is selected from halogen ions, aliphatic carboxylate ions and fluoroborate ion. However, in the formula (z), one to three, especially two or three of $R^{10}$ to $R^{13}$ may be the aryl and substituted aryl groups and the other one to three, especially one or two, of $R^{10}$ to $R^{13}$ may be the alkyl, aralkyl or substituted aralkyl groups, and $X^-$ may be selected from halogen ions, aliphatic carboxylate ions and a fluoroborate ion.

The phosphonium compounds of the formula (z) wherein all of $R^{10}$ to $R^{13}$ are the aryl or substituted aryl groups mentioned above, and $X^\ominus$ is selected from halogen ions, are preferably selected from tetraphenylphosphonium chloride, tetraphenylphosphonium bromide, tetraphenylphosphonium iodide, 4-chlorophenyltriphenylphosphonium chloride, 4-chlorophenyltriphenylphosphonium bromide, 4-chlorophenyltriphenylphosphonium iodide, 4-ethoxyphenyltriphenylphosphonium chloride, 4-ethoxyphenyltriphenylphosphonium bromide, 4-ethoxyphenyltriphenylphosphonium iodide, 4-methylphenyltriphenylphosphonium chloride, 4-methylphenyltriphenylphosphonium bromide, 4-methylphenyltriphenylphosphonium iodide, 9-fluorenylphenyltriphenylphosphonium chloride, and 9-fluorenylphenyltriphenylphosphonium bromide.

The phosphonium compounds of the formula (z) wherein all of $R^{10}$ to $R^{13}$ are the aryl or substituted aryl groups mentioned above, and $X^\ominus$ is selected from aliphatic carboxylate ions, are preferably selected from tetraphenylphospho-nium acetate, 4-chlorophenyltriphenylphosphonium acetate, 4-ethoxyphenyltriphenylphosphonium acetate and 4-methylphenyltriphenylphosphonium acetate.

The phosphonium compounds of the formula (z) wherein all of $R^{10}$ to $R^{13}$ are the aryl or substituted aryl groups mentioned above, and $X^\ominus$ is a fluoroborate are preferably selected from tetraphenylphosphonium fluoroborate, 4-chlorophenyltriphenylphosphonium fluoroborate, 4-ethoxyphenyltriphenylphosphonium fluoroborate and 4-methylphenyltriphenylphosphonium fluoroborate.

In the step (A) of the process of the present invention, the decarbonylation catalyst may comprise one or more of the above-mentioned organic phosphorus compounds. Also, the decarbonylation catalyst may be dissolved or suspended in the reaction mixture fed into the step (A).

In the step (A), the decarbonylation catalyst is preferably employed in an amount of 0.001 to 50 molar %, more preferably 0.01 to 20 molar %, based on the molar amount of the diaryl oxalate supplied to the step (A).

The decarbonylation catalyst for the step (A) containing at least one organic phosphorus compound may be used together with a promoter comprising at least one member selected from inorganic halogen compounds and organic halogen compounds. Usually, the promoter is used preferably in an amount of 0.01 to 150 times, more preferably 0.1 to 100 times, the total molar amount of the organic phosphorus compound in the catalyst.

The inorganic halogen compounds usable as promoters are preferably selected from, halogenated aluminum compounds, for example, aluminum chloride and aluminum bromide; halogenated platinum group metal compounds, for example, chloroplatinic acid, ruthenium chloride, and palladium chloride; halogenated phosphorus compounds, and halogenated sulfur compounds.

The organic halogen compounds usable as promoters are preferably selected from halogenated hydrocarbons, for example, alkyl halides and aralkyl halides, and halogen-substituted aliphatic carboxylic acids.

In the decarbonylation step (A) of the process of the present invention, preferably, the decarbonylation reaction of the diaryl oxalate is carried out in the presence of a specific decarbonylation catalyst comprising at least one organic phosphorus compound at a temperature of, preferably 100 to 450° C., more preferably 160 to 400° C., still more preferably 180 to 350° C., while removing the resultant by-product comprising carbon monoxide gas, to prepare a diaryl carbonate. The reaction pressure for the step (A) may be a reduced pressure, the ambient atmospheric pressure or an increased pressure. Usually the decarbonylation reaction can be carried out under a pressure of 100 mmHg to 10 kg.cm².

Preferably, the decarbonylation reaction is carried out in liquid phase and, usually, no reaction medium is necessary. Optionally, an aprotic solvent, for example, N-methylpyrrolidone or sulfolane, is used as a reaction medium for the decarbonylation reaction.

The reactor for the decarbonylation step (A) is not limited to a specific type of reactor as long as the reactor enables the diaryl oxalate to be decarbonylated into a corresponding diaryl carbonate and carbon monoxide. Also, there is no limitation to the type of materials for the reaction apparatus for the step (A). Usually the reactor for the step (A) is made mainly from a glass which may be used for lining, stainless steel (SUS), an aluminum alloy, a nickel alloy, zirconium or tantalum.

The reactor for the step (A) may be selected from full-mixing type (or agitation type) reactors with single or multiple reaction vessels and tubular or column type reactors with a multi-pipe type heat exchanger.

A liquid phase fraction delivered from the reactor of the step (A) contains non-reacted diaryl oxalate and the decarbonylation catalyst in addition to the target diaryl carbonate. The separation, refining and collection of the diaryl carbonate from the liquid phase fraction can be carried out by using a conventional refining-collecting apparatus.

The separating, refining and collecting procedure of the diaryl carbonate can be carried out by separating and recovering the decarbonylatlon catalyst by means of an evaporator or thin membrane evaporator, and by subjecting the resultant vapor phase fraction to a distiller having a certain number (particularly 5 to 50) of filler-packed layers or trays, to collect the target diaryl carbonate with a high degree of purity.

In the step (B) of the process of the present invention, the diaryl carbonate supplied from step (A) of the process of the present invention is condensation-polymerized with a polyhydroxyl compound, while separating and recovering a by-product comprising a hyroxyaryl compound, to produce a polycarbonate. In this case, optionally, the recovered hydroxyaryl compound, for example, phenol, is refined by a distillation refining procedure to remove high boiling temperature impurities, and the refined hydroxyaryl compound is collected and re-used for the transesterification of the dialkyl oxaleate to prepare a diaryl oxalate.

The polyhydroxyl compounds include mainly polyhydroxyaryl compounds in which a plurality, preferably two of hydroxyl groups are directly bonded to an aryl ring structure. The polyhydroxyl compound preferably consists of dihydroxyaryl compounds, or comprises at least 60 molar % or more, more preferably 80 molar % or more, of dihydroxyaryl compound based on the total molar amount of the polyhydroxyl compound. For example, the polyhydric hydroxyl compound preferably consists of 100 molar % of 2,2-bis(4-hydroxyphenyl)propane or comprises 80 molar % or more, more preferably 90 molar % or more, of 2,2-bis(4-hydroxyphenyl)propane. In the polyhydroxyl compound, at least one aliphatic polyhydroxy-hydrocarbon compound, for example, ethylene glycol, propylene glycol, butane diol, or hexane diol, may be included in addition to the polyhydroxyaryl compound.

The polyhydroxyaryl compound is preferably selected from, for example, (1) bis(hydroxyaryl)alkanes which may be referred to as bisphenol compounds, for example, bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-2-methylphenyl)propane, 1,1-bis(4-hydroxy-2-tert-butylphenyl)propane, and 2,2-bis(4-hydroxy-3-bromophenyl)propane; (2) dihydroxyarylether compounds, for example, 4,4'-dihydroxydiphenylether and 4,4'-dihydroxy-3,3'-dimethyldiphenylether; (3) dihydroxyarylsulfide compounds, for example, 4,4'-dihydroxydiphenylsufide and 4,4'-dihydroxy-3,3'-dimethyldiphenylsulfide; (4) dihydroxyarylsulfoxide compounds, for example, 4,4'-dihydroxydiphenylsulfoxide and 4,4'-dihydroxy-3,3'-dimethyldiphenylsulfoxide; and (5) dihydroxyarylsulfone compounds, for example, 4,4'-dihydroxydiphenylsulfone and 4,4'-dihydroxy-3,3'-dimethyldiphenylsulfone.

The diaryl carbonates usable for the process of the present invention include diphenyl carbonate, ditolyl carbonate, bis(chlorophenyl)carbonate, bis(m-cresyl) carbonate and dinaphthyl carbonate. Among them, the diaryl carbonates having 13 to 20 carbon atoms are preferably employed, and especially diphenyl carbonate is more preferably used for the production of the polycarbonate.

In step (B) of the process of the present invention, the diaryl carbonate may be used together with at least one dicarboxylic acid ester. The dicarboxylic acid ester may be selected from aromatic dicarboxylic acid esters, for example, diphenyl terephthalate and diphenyl isophthalate.

When the diaryl carbonate is used in combination with a carboxylic acid ester, for the condensation-polymerization step (B), the resultant product is a polyestercarbonate. Namely, in the process of the present invention, the target polycarbonates include the polyestercarbonates.

In step (B) of the process of the present invention for the production of the polycarbonate, the diaryl carbonate is preferably used in an amount of 1.001 to 1.5 moles, more preferably 1.01 to 1.3 moles, per mole of the polyhydroxyl compound, particularly dihydroxyl compound, more particularly, dihydroxyaryl compound. Also, in step (B) of the process of the present invention, the diaryl carbonate and the polyhydroxyl compound may be added with an appropriate amount of a polymerization regulator, a terminal modifier and/or a monophenol compound.

In step (B) of the process of the present invention, a diaryl carbonate and a polyhydroxyl compound are subjected to a condensation-polymerization procedure in the presence of a basic catalyst, comprising at least one member selected from, for example, organic acid salts, inorganic acid salts, hydroxides, hydrogenated compounds and alcolates of alkalic metals and alkaline earth metals and nitrogen-containing basic compounds, at a temperature of about 100 to 330° C., while evaporate-removing the resultant by-product comprising a hydroxyaryl compound. In this step B, the condensation-polymerization procedure is preferably carried out in melt phase in a single step or two or more steps while rising the reaction temperature, to produce a polycarbonate.

The basic catalyst usable for step (B) preferably comprises at least one member selected from:

(1) nitrogen-containing basic compounds including ammonium hydroxide compounds having an alkyl, aryl or arakyl group, for example, tetramethylammonium hydroxide, tetraethylammonium hydroxide, tetrabutylammonium hydroxide and trimethylbenzylammonium hydroxide; tertiary amine compounds, for example, trimethylamine, triethylamine, dimethylbenzylamine, and triphenylamine; secondary amine compounds; primary amine compounds; and ammonium borohydride compounds, for example, tetramethylammonium borohydride and tetrabutylammonium borohydride, (2) basic alkalic metal compounds including sodium hydroxide, potassium hydroxide, lithium hydroxide, sodium hydrogen carbonate, potasium hydrogen carbonate, lithium hydrogen carbonate, sodium carbonate, potassium carbonate, lithium carbonate, sodium acetate, potassium acetate, lithium acetate, sodium stearate, sodium boron hydroxide, sodium benzoate, sodium dihydrogen phosphate, potassium dihydrogen phosphate, lithium dihydrogen phosphate, sodium dihydrogen phosphite, potasium dihydrogen phosphite, disodium hydrogen phoshate, dipotassium hydrogen phosphate, dilithium hydrogen phosphate, and a sodium salt of phenol, and (3) basic alkaline earth metal compounds including calcium hydroxide, barium hydroxide, magnesium hydroxide, strontium hydroxide, calcium hydrogen carbonate, barium hydrogen carbonate, magnesium hydrogen carbonate, calcium carbonate, barium carbonate, magnesium carbonate, strontium carbonate, calcium acetate, barium acetate, barium stearate and magnesium stearate.

The basic catalyst for step (B) may contain, in addition to the above-mentioned basic compound, boric acid or a boric acid ester. The boric acid ester may be selected from trimethyl borate, triethyl borate, tributyl borate, trihexyl borate, triphenyl borate, and tritolyl borate.

In the step (B) of the process of the present invention, the basic catalyst as mentioned above is preferably employed in an amount of $10^{-8}$ to $10^{-1}$ molar %, more preferably $10^{-7}$ to $10^{-2}$ molar %, per mole of the polyhydroxyl compound, particularly the dihydroxyaryl compound, used for the condensation-polymerization reaction.

The condensation-polymerization reaction in step (B) of the present invention can be carried out under the similar conditions to in conventional condensation-polymerization reaction for the polycarbonate. Particularly, the condensation-polymerization procedure of the polyhydroxyl compound (particularly the dihydroxyaryl compound) with the diaryl carbonate is carried out, in a first stage, at a temperature of 80 to 250° C., preferably 100 to 230° C., more preferably 150 to 200° C., for 0.01 to 5 hours, preferably 0.1 to 4 hours, more preferably 0.25 to 3 hours, under the ambient atmospheric pressure or a reduced pressure and then, in a second stage, at a temperature higher than that in the first stage under a pressure lower than in the first stage. In the second stage, preferably, the reaction temperature is increased to a final level of 240 to 320° C. and the reaction pressure is reduced to a final level of 1 mmHg or less.

The condensation-polymerization procedure in step (B) can be carried out continuously or in batch. The reaction apparatus for the condensation-polymerization procedure may be a vessel type reactor, a pipe type reactor, or a column type reactor. Particularly, for the second stage of the condensation-polymerization procedure, a self-cleaning type reactor is preferred.

In step (B) of the process of the present invention, the by-product comprising a hydroxyaryl compound, for example, phenol, produced by the condensation-polymerization reaction is evaporated and separated from the reaction mixture, and the separated hydroxyaryl compound is refined by a refining apparatus, for example, an evaporator or distillater, to provide a refined hydroxyaryl compound. The refined hydroxyaryl compound preferably has a content of an organic impurity (particularly organic substances having boiling temperatures higher than that of the hydroxyaryl compound) of about 500 ppm or less, more preferably 200 ppm or less, still more preferably 100 ppm or less.

In the refining procedure for the hydroxyaryl compound, the hydroxyaryl compound produced as a by-product of the condensation-polymerization reaction is isolated by evaporation, the isolated hydroxyaryl compound fraction is refined by an evaporator or a distiller to an extent such that a liquid fraction containing a high boiling temperature impurity in a high content is removed in an amount of about 5 to 20% by weight, preferably 6 to 15% by weight based on the total weight of the isolated hydroxyaryl compound fraction. The resultant refined hydroxyaryl compound fraction is returned to and reused in the diaryl oxalate-preparation procedure by the transesterification of the dialkyl oxalate.

The removed hydroxyaryl compound fraction containing the high boiling temperature impurity may be refined to further collect re-usable compounds.

The condensation-polymerization apparatus for step (B) of the process of the present invention is preferably provided with an apparatus, for example, a distiller, for refining the isolated hydroxyaryl compound fraction, and means for continuously or periodically transporting the refined hydroxyaryl compound fraction (for example, refined phenol fraction) to the transesterification reactor (for example, the first distillation reactor 1 of FIGS. 2 and 3. The transporting means comprises, for example, a transporting pump, a storage tank for the refined hydroxyaryl compound fraction and, connected to the pump, conduits for connecting the pump and the storage tank to the refining apparatus and the transesterification reactor.

In an embodiment of the process of the present invention, a diaryl carbonate mixture delivered, as a liquid fraction, from step (A) is subjected to a refining procedure (A-a), the resultant refined diaryl carbonate mixture is subjected to a collecting procedure (A-b), and the collected diaryl carbonate mixture having an increased degree of purity of diaryl carbonate is supplied to step (B). This embodiment is shown in FIG. 4.

Figure 4:
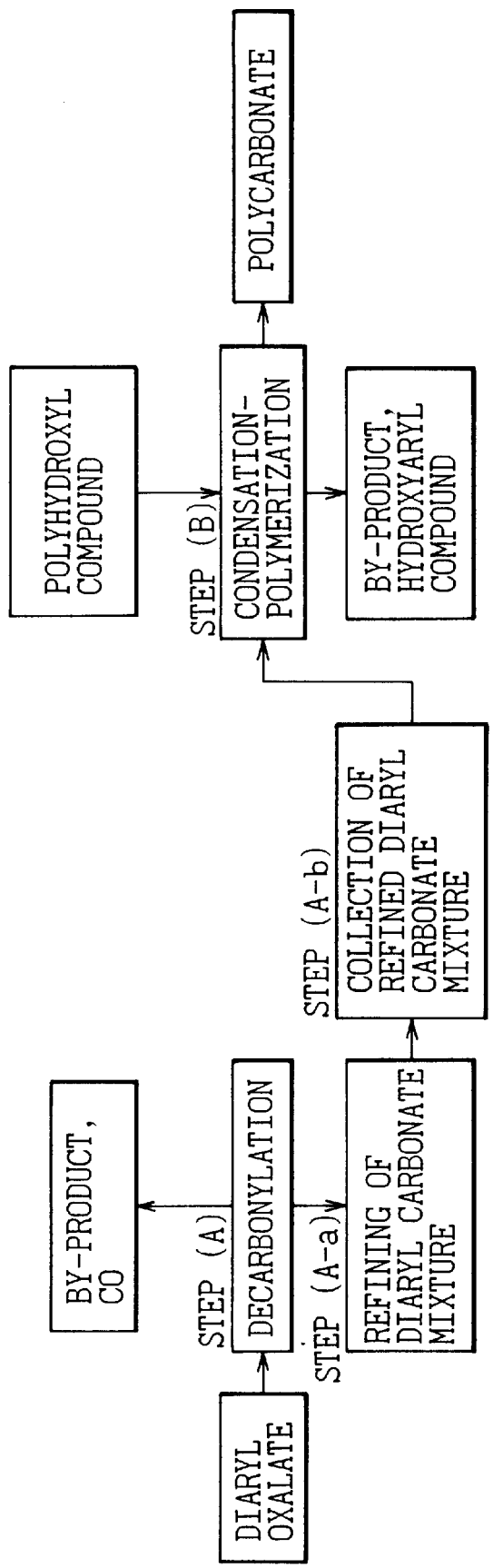
FIG. 4 is a flow sheet showing another embodiment of the process of the present invention.

In FIG. 4, a diaryl oxalate is supplied to step (A) in which the diaryl oxalate is decarbonylated in the presence of a decarbonylation catalyst, while removing a by-product comprising carbon monoxide from the reaction system and the resultant diaryl carbonate mixture is fed to a refining step (A-a), the resultant refined diaryl carbonate is collected in liquid phase in a step (A-b), and then fed into step (B) in which the diaryl carbonate is condensation-polymerized with a polyhydroxyl compound, while separating a by-product comprising a hydroxyaryl compound. A polycarbonate resin is obtained. In the refining step (A-a), the diaryl carbonate mixture delivered as a liquid fraction from step (A) is subjected to an evaporation or distillation procedure, to provide a refined diaryl carbonate mixture separated from the catalyst for the decarbonylation step (A). The resultant vapor phase fraction is delivered as a refined diaryl carbonate mixture from the step (A-a) and fed into the collecting step (A-b). The separated catalyst is discharged from the refining step (A-a).

In the embodiment, the refining procedure (A-a) is preferably effected to an extent such that the resultant refined diaryl carbonate mixture has a content of the diaryl oxalate of 2000 ppm or less more preferably 1000 ppm or less, still more preferably 500 ppm or less, and a content of the diaryl carbonate of 95% by weight or more, more preferably 98% by weight or more, still more preferably 99% by weight or more.

In the refining step (A-a), the resultant refined diaryl carbonate mixture has, as organic impurity contents, preferably 1) a content of diaryl oxalate of 1000 ppm or less, 2) a content of phenyl p-chlorobenzoate of 200 ppm or less, more preferably 1) a content of diaryl oxalate of 1000 ppm or less, 2) a content of phenyl p-chlorobenzoate of 200 ppm or less, particularly 100 ppm or less, 3) a content of phenyl benzoate, and 4) a content of phenyl salicylate of 200 ppm or less, particularly 100 ppm or less.

In the refining step (A-a), the resultant refined dlaryl carbonate mixture having 1) a content of diaryl oxalate of 200 ppm or less, particularly 100 ppm or less, 2) a content of phenyl p-chlorobenzoate of 50 ppm or less, particularly 5 ppm or less, 3) a content of phenyl benzoate of 50 ppm or less, particularly 5 ppm or less, and 4) a content of phenyl salicylate of 50 ppm or less, particularly 5 ppm or less, is most preferred for the condensation-polymerization of step (B).

The collected diaryl carbonate mixture to be fed to step (B) preferably contains substantially no inorganic impurity. Namely, the collected diaryl carbonate mixture having a total content of Group VIII raetals (for example, iron and nickel) and chromium, and a total content of alkali metals, for examfple, sodium and potassium of respectively 1 ppm or less, particularly 500 ppb or less, is advantageously used for the condensation-polymerization step (B).

The steps (A-a) and (A-b) of the process of the present invention will be further explained by referring to FIGS. 5 and 6, as follows.

Figure 5:
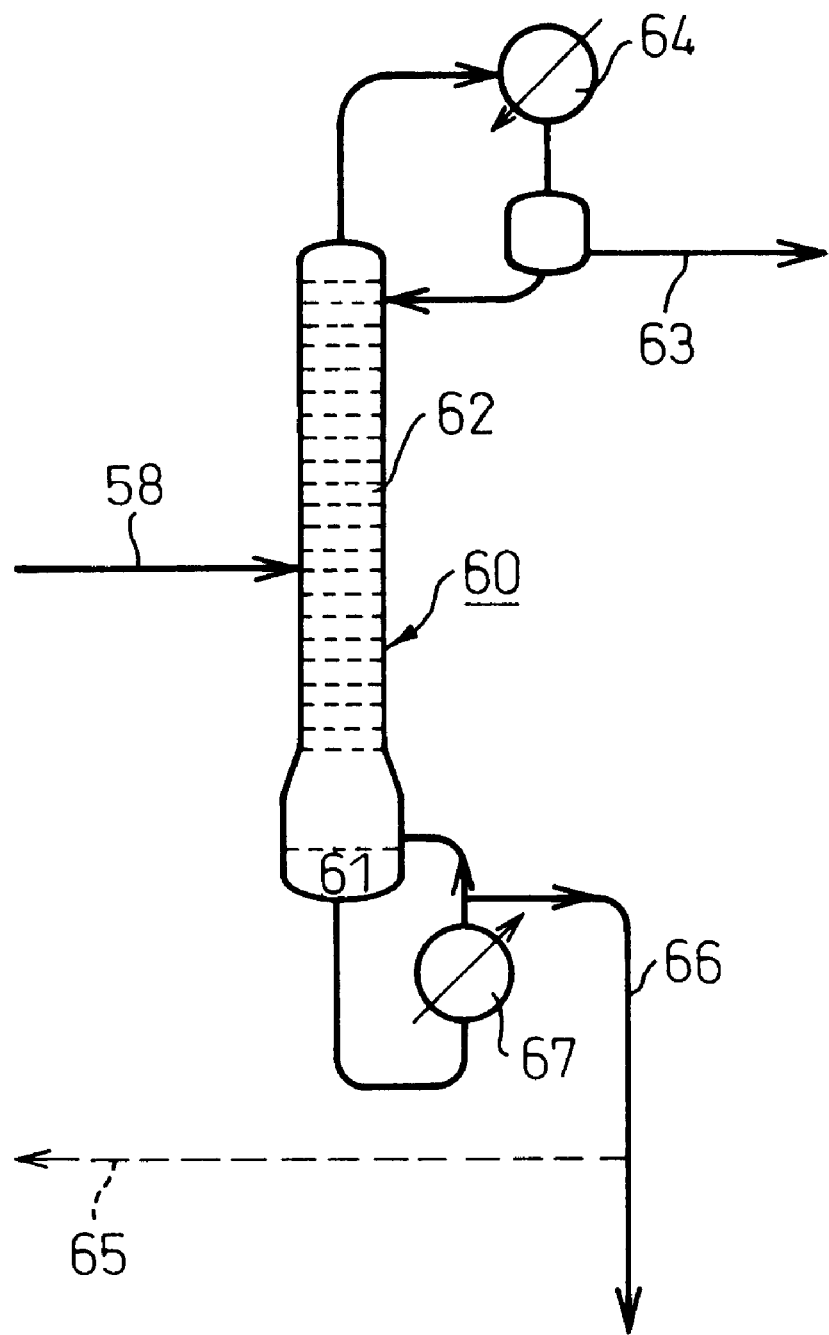
FIG. 5 is an explanatory diagram of an embodiment of the diaryl carbonate mixture-refining step (A-a) of the process of the present invention.

In FIG. 5, a diaryl carbonate mixture obtained by step (A) (not shown in FIG. 5) and containing non-reacted diaryl oxalate, diaryl carbonate, other organic substance and the decarbonylation catalyst is fed into a middle portion of the distillation column 60 having a plurality of trays 62, through a conduit 58. A resultant vapor fraction containing the refined diaryl carbonate mixture is withdrawn from the distillation column 60 through the top portion thereof and is condensed by a cooler 64. The condensed diaryl carbonate mixture is collected through a conduit 63, and the remaining portion is returned to the top portion of the distillation column 60.

Also, in the distillation column 60, a resultant liquid fraction containing the decarbonylation catalyst in an increased content is accumulated in the bottom portion 61 of the column 60. The temperature of the accumulated liquid fraction is maintained at a desired level by circulating it through a heater 67. The liquid fraction is withdrawn from the bottom portion 61 through a conduit 66 and is optionally returned to step (A) through a conduit 65. The collected diaryl carbonate mixture has an increased content of the diaryl carbonate and a decreased content of impurity, and is fed into a condensation-polymerization reactor (not shown in FIG. 5) of step (B).

In FIG. 6, a diaryl carbonate mixture obtained by step (A) (not shown in FIG. 6) is fed into a bottom portion 71 of an evaporator 70 through the conduit 58. In the evaporator 70, the fed liquid fraction is heated, a resultant vapor fraction comprising a diaryl carbonate mixture having an increased content of diaryl carbonate is withdrawn from the evaporator 70 through a top portion thereof and condensed by a cooler 73. The condensed diaryl carbonate mixture is fed, through a conduit 74, into a middle portion of a refining distillation column 80 having a plurality of trays 82. Also, a remaining liquid fraction in the evaporator 70 contains the catalyst and is withdrawn from the bottom portion 71 through a conduit 72. Optionally, the withdrawn liquid fraction is re-activated and returned into step (A) through a conduit 75, and re-used as a decarbonylation catalyst.

The condensed fraction is further refined in the distillation column 80, which is preferably selected from packing columns and multi-step distillation column having a certain theoretical number of steps, for examples 5 to 50 steps, in the same manner as in the distillation column 60 in FIG. 5. A resultant vapor fraction containing the diaryl carbonate is withdrawn from the column 80 through the top portion thereof and condensed by a cooler 84. The condensed diaryl carbonate mixture having a further increased content of the diaryl carbonate and a further decreased content of the impurity is collected through a conduit 83, and the remaining portion is returned into the top portion of the column 80. Also, a resultant liquid fraction is accumulated in the bottom portion 81, circulated through a heater 85 to control the temperature of the liquid fraction to a desired level and withdrawn through a conduit 87. The condensed diaryl carbonate mixture is fed into a condensation-polymerization reactor (not shown in FIG. 6) of step (B).

Since the refined and collected diaryl carbonate mixture has a significantly increased content of diaryl carbonate and a significantly decreased content of impurity, the polycarbonate resin having high quality can be obtained with a high efficiency. Namely, the condensation-polymerization step (B) can be carried out by a melt polymerization method with no difficulty.

Also, the resultant polycarbonate has a high molecular weight, for example, 10,000 to 80,000 and good physical and chemical properties.

Also, the polycarbonate resin produced by the process of the present invention is substantially colorless and thus is significantly useful in various types of industries.

EXAMPLES

The present invention will be further explained by the following examples.

The resultant reaction product mixtures were analyzed by gas chromatography.

Example 1

A polycarbonate resin was produced by the following procedures.

(1) Preparation of diphenyl oxalate

Diphenyl oxalate was prepared from dimethyl oxalate and phenol by using the apparatus shown in FIG. 3 including first and second distillation reactors and a refining distillation column.

As a first distillation reactor, a fifty plate Oldershaw type-distiller having an inner diameter of 32 mm and provided with a one liter bottom flask was employed.

A mixed solution comprising 54.1% by weight of phenol, 45.3% by weight of dimethyl oxalate and 0.5% by weight of tetraphenoxytitanium was fed into the twelfth step from the top of the first reactor at a flow rate of 600 ml/hr, while heating the bottom flask by a mantle heater at a temperature of 190° C. In the first reactor, dimethyl oxalate was subjected to a transesterification with phenol in the presence of the catalyst tetraphenoxytitanium, and the resultant vapor fraction was continuously withdrawn from the top portion of the first reactor and was condensed by a cooler at a reflux ratio of 2. When the reaction in the first reactor was stabilized, namely 5 hours after the start of the feeding of the reaction material mixture, the liquid fraction in the bottom flask had a composition of 6.23% by weight of diphenyl oxalate, 29.95% by weight of methylphenyl oxalate, 23.88% by weight of dimethyl oxalate, and 29.41% by weight of phenol, and withdrawn from the bottom flask at a flow rate of about 603 g/hr. In this case, the vapor fraction was withdrawn from the top portion of the first reactor at a flow rate of about 44 g/hr and condensed. The condensed fraction had a composition of 99.7% by weight of methyl alcohol and 0.3% by weight of dimethyl oxalate.

The liquid fraction withdrawn from the bottom flask of the first reactor was fed into the twelfth step from the top of a second distillation reactor consisting of the same Oldershaw-type distiller as used for the first reactor, at a flow rate of 600 ml/hr under a reduced pressure of 200 mmHg, and the bottom flask was heated at a temperature of 200° C. by a mantle heater. In this second reactor, the fed liquid fraction was subjected to a disproportionation reaction, while a resultant vapor fraction was withdrawn from the top portion of the second reactor without refluxing.

When the reaction in the second distillation reactor was stabilized, namely 4 hours after the start of feeding of the liquid fraction of the first reactor, the resultant liquid fraction in the bottom flask had a composition of 65.25% by weight of diphenyl oxalate, 18.43% by weight of methylphenyl oxalate, 1.02% by weight of dimethyl oxalate, and 13.93% by weight of phenol. The liquid fraction was withdrawn at a flow rate of about 258 g/hr from the bottom flask of the second reactor. Also, the vapor fraction was withdrawn from the top portion of the second reactor and condensed. The condensed fraction had a composition of 1.57% by weight of methyl alcohol, 2.97% by weight of dimethyl oxalate, 48.51% by weight of phenol, 2.97% by weight of methylphenyl oxalate and 0.42% by weight of diphenyl oxalate and was collected at a flow rate of about 371 g/hr.

The liquid fraction recovered from the bottom flask of the second reactor was fed into a rotating membrane type evaporator, having a heat-transfer surface area of 0.1 m$^2$, under a reduced pressure of 15 mmHg and at a flow rate of 200 ml/hr, while heating the evaporator, with a heating medium, to a temperature of 200° C. In the evaporator, dimethyl oxalate, phenol, methylphenyl oxalate and diphenyl oxalate in the fed fraction were continuously evaporated.

The resultant vapor fraction was withdrawn from the evaporator and fed into a glass distiller having an inner diameter of 30 mm and a length of 2 m and packed with Helipack packings (5(D) mm×5(H) ram) through an inlet located 8 cm below the top of the distiller, to continuously distill the vapor fraction.

The resultant vapor fraction was withdrawn from the distiller through the top portion thereof and condensed. The condensed fraction had a composition of 3.05% by weight of dimethyl oxalate, 41.73% by weight of phenol, and 55.21% by weight of methylphenyl oxalate, and was recovered at a flow rate of about 63 ml/hr. Also, the resultant liquid fraction was withdrawn from the distiller through an outlet located 40 cm above the bottom thereof at a flow rate of about 120 g/hr. The liquid fraction comprised diphenyl oxalate in a degree of purity of 99.7% by weight. Also, the withdrawn liquid fraction had a content of phenol of 0.04% by weight and a content of methylphenyl oxalate 0.05% by weight.

Further, a liquid fraction containing about 2.5% by weight, in terms of titanium metal, of the titanium containing catalyst was withdrawn from the bottom of the distiller.

(2) Preparation of diphenyl carbonate

The diphenyl oxalate prepared in the above-mentioned transesterification procedures was supplied to the following diphenyl carbonate-preparation procedures.

The diphenyl oxalate was mixed with 1 molar % of tetraphenylphosphonium chloride and heated to a temperature of 150° C. to provide a solution. The solution was fed into an apparatus consisting of two glass reactors connected in series to each other and each equipped with a thermometer, a stirrer, and a overflow pipe and having a capacity of one liter, by using a constant delivery pump at a flow rate of 300 ml/hr, while heating the two rectors by a mantle heater at a temperature of 230° C., to decarbonylate diphenyl oxalate. In each reactor, the overflow level was adjusted to at level corresponding to 600 ml.

Twenty hours after the start of feeding of the diphenyl oxalate solution, the resultant overflowed liquid fraction of the second reactor, namely the decarbonylated liquid fraction, had a composition of 14.6% by weight of diphenyl oxalate, 84.0% by weight of diphenyl carbonate, and 0.08% by weight of phenol, and was delivered at a flow rate of 270 ml/hr. Also, the gas fraction generated in each reactor consisted of carbon monoxide with a degree of purity of about 100%. The gas fraction was recovered in a total amount of 25 liters/hr under ambient atmospheric pressure and temperature.

The liquid fraction withdrawn from the decarbonylation apparatus was fed into the same type of rotating membrane type evaporator that was used in the preparation of diaryl oxalate, under a reduced pressure of 20 mmHg at a flow rate of 250 ml/hr, while heating the evaporator with a heating medium to a temperature of 200° C., to collect tetraphenylphosphonium chloride. The resultant vapor fraction was withdrawn from the evaporator and condensed. The condensed fraction had a composition of 92.2% by weight of diphenyl carbonate and 7.7% by weight of diphenyl oxalate.

The condensed fraction was continuously fed into the same type of glass distiller as that used in the preparation of diphenyl oxalate, and continuously distilled under a column top pressure of 20 torr at a reflux ratio of 5. A refined diphenyl carbonate having a degree of purity of 99.9% was collected at a flow rate of about 220 ml/hr.

(3) Production of polycarbonate (Method A)

Bisphenol A in an amount of 400 g was refined by recrystallization from a mixed solvent consisting of 800 ml of toluene and 36 ml of methyl alcohol (volume ratio=22:1). The refined bisphenol A and the diphenyl carbonate prepared by the above-mentioned procedures (1) and (2) were used for the production of a polycarbonate resin.

A polymerization catalyst solution having a pH value of 4.35 was prepared by dissolving 0.6815 g of a catalyst consisting of potassium dihydrogen phosphate (with a degree of purity of 99.99%) in 50 ml of ion-exchanged water. The catalyst solution had a concentration of the catalyst of 0.1 mole/liter.

A stainless steel (SUS 316L) reactor with a capacity of 100 ml was charged with 22.83 g (0.1 mole) of the refined bisphenol A, 22.71 g (0.106 mole) of diphenyl carbonate and 0.03 ml (5 ppm in terms of a potassium based on the weight of bisphenol A) of the polymerization catalyst solution with a catalyst concentration of 0.1 mole/liter. Air in the stainless steel reactor was removed under vacuum at room temperature for 0.5 hour, a nitrogen gas was filled in the reactor at the ambient atmospheric pressure, and then the reactor was heated to promote the condensation-polymerization reaction of diaryl carbonate with bisphenol A. The reaction mixture was heated at a temperature of 230° C. under a pressure of 100 torr for one hour after the start of generation of phenol, at 240° C. under 100 torr for 0.5 hour, and at 255° C. under 100 torr for 10 minutes, then the pressure in the reactor was reduced from 100 torr to 50 torr in a time of 15 minutes, and the reaction mixture was further heated under these conditions for 15 minutes, and finally, the pressure was reduced from 50 torr to 0.1 torr at a temperature of 270° C. in the time of 30 minutes and the reaction mixture was further heated at 270° C. under 0.1 torr for one hour to produce a polycarbonate resin. The polycarbonate was obtained in an amount of 25.44 g with an yield of 100%.

In the above-mentioned condensation-polymerization procedures, phenol was recovered in a total amount of 17.6 ml from the polymerization system. The recovered phenol was refined by distillation in a distillation column and a residual liquid fraction containing high-boiling-point impurities was removed in an amount of about 10% by weight. The distillation-refined phenol was collected. The refined phenol had an organic impurity content of 10 ppm or less and substantially no other impurity. Namely, the refined phenol had a very high degree of purity.

The refined phenol was returned to the transesterification procedure for preparing diphenyl oxalate from dialkyl oxalate and reused together with fresh phenol. No problem occurred in the transesterification reaction.

The polycarbonate resin obtained by the above-mentioned procedures had a logarithmic viscosity number of 0.497 dl/g determined in a concentration of 0.5 g/100 ml in CHCl$_3$ at a measurement temperature of 30° C. and a weight average molecular weight of 53,000 determined by a polystyrene-conversion method. Also, when observed by naked eye, the polycarbonate resin was substantially colorless.

Example 2

A polycarbonate resin was produced by the following procedures.

(1) Preparation of diphenyl oxalate

By the same transesterification procedure for the preparation of diphenyl oxalate as in Example 1, about 120 g/hr of diphenyl oxalate witn a degree of purity of 99.6% by weight obtained.

(2) Preparation of diphenyl carbonate

The above-mentioned diphenyl oxalate was subjected to the same decarbonylation procedure as in Example 1 for 24 hours. About 220 ml/hr of diphenyl carbonate having a degree of purity of 99.9% was obtained.

(3) Production of polycarbonate (Method B)

A vessel type reactor (lined with a nickel containing alloy) was charged with 20 moles of 2,2-bis(4-hydroxy-phenyl)propane, 21 moles of the diphenyl carbonate prepared by the above-mentioned procedures and 6 ml of an aqueous solution of potassium dihydrogen phosphate (degree of purity: 99.99%) in a concentration of 0.1 mole/liter. The charged mixture was melted at a temperature of 160° C. in a nitrogen gas atmosphere and stirred for one hour, then the temperature of the melt was gradually increased to 270° C. while gradually reducing the pressure in the reactor to 1 torr, and finally, the melt was stirred at 270° C. under one torr for 4 hours, while evaporating and recovering the resultant by-product comprising phenol, to prepare a polycarbonate prepolymer. Finally, the prepolymer was subjected to a polymerization procedure in a vertical, biaxial self-cleaning type reactor at a temperature of 270° C. under a pressure of 0.1 torr for 50 minutes. A colorless, transparent polycarbonate resin having a molecular weight of about 55,000 was obtained.

In the above-mentioned condensation-polymerization procedures, phenol was recovered in a total amount of 3760 g from the polymerization system. The recovered phenol was distillation-refined in a distillation column, and a remaining liquid fraction containing high boiling temperature purity was removed in an amount of about 10% by weight. A refined phenol having an increased degree of purity was obtained. Namely, the refined phenol had a content of organic impurity of 10 ppm or less and contained substantially no other impurity.

When the refined phenol was returned to the first distillation reactor for the preparation of diphenyl oxalate and re-used together with fresh phenol, no difficulty occurred.

In Examples 1 and 2, it was confirmed that the diaryl carbonate produced from dialkyl oxalate and a hydroxyaryl compound through the transesterification and decarbonylation procedures is useful for producing a polycarbonate having a satisfactory quality with high efficiency.

Example 3

A polycarbonate resin was produced by the following procedures.

(1) Preparation of diphenyl carbonate

Diphenyl carbonate was prepared from diphenyl oxalate by the following procedures.

The diphenyl oxalate was mixed with 1 molar % of tetraphenylphosphonium chloride and heated to a temperature of 150° C. to provide a solution. The solution was fed into an apparatus consisting of two glass reactors connected in series to each other and each equipped with a thermometer, a stirrer, and a overflow pipe and having a capacity of one liter, by using a constant delivery pump at a flow rate of 300 ml/hr, while heating the two connected rectors by a mantle heater to a temperature of 230° C., to decarbonylate diphenyl oxalate. In each reactor, the overflow level was adjusted to a level corresponding to 600 ml.

Twenty hours after the start of feeding of the diphenyl oxalate solution, the resultant overflowed liquid fraction of the second reactor, namely the decarbonylated liquid fraction, had a composition of 14.6% by weight of diphenyl oxalate, 84.0% by weight of diphenyl carbonate, and 0.08% by weight of phenol, and was delivered at a flow rate of 270 ml/hr. Also, the gas fraction generated in each reactor consisted of carbon monoxide in a degree of purity of about 100%. The gas fraction was recovered in a total amount of 25 liters/hr under ambient atmospheric pressure and temperature.

(2) Refining of diphenyl carbonate

The liquid fraction withdrawn from the decarbonylation reactor was refined by the procedure as shown in FIG. 6. The liquid fraction was fed into a rotating membrane type evaporation under a reduced pressure of 20 mmHg at a flow rate of 250 ml/hr, while heating the evaporator with a heating medium at a temperature of 200° C., to collect tetraphenylphosphonium chloride. The resultant vapor fraction was withdrawn from the evaporator and condensed. The condensed fraction had a composition of 92.2% by weight of diphenyl carbonate and 7.7% by weight of diphenyl oxalate.

The condensed fraction was continuously fed into a multi-step glass distiller, and continuously distilled under a column top pressure of 20 torr at a reflux ratio of 5. A refined diphenyl carbonate having a degree of purity of 99.9% was collected at a flow rate of about 220 ml/hr.

The refined diphenyl carbonate had a content of diphenyl oxalate (DPO) of 10 ppm or less, a content of phenyl parachlorobenzoate (PPCB) of 5 ppm or less, a content of phenyl benzoate (PB) of 5 ppm or less and a content of phenyl salicylate (PS) of 5 ppm or less.

Also, in the refined diphenyl carbonate, the total content of Group VIII metals, for example, iron and nickel, the total content of chromium, the total content of alkali metals, for example, sodium and potassium, and the total content of phosphorus compounds respectively do not exceed one ppm.

(3) Production of polycarbonate (Method A)

Bisphenol A in an amount of 400 g was refined by recrystallization thereof from a mixed solvent consisting of 800 ml of toluene and 36 ml of methyl alcohol (volume ratio=22:1). The refined bisphenol A and the diphenyl carbonate prepared by the above-mentioned procedures (1) and (2) were used for the production of a polycarbonate resin.

A polymerization catalyst solution having a pH value of 4.35 was prepared by dissolving 0.6815 g of a catalyst consisting of potassium dihydrogen phosphate (with a degree of purity of 99.99%) in 50 ml of ion-exchanged water. The catalyst solution had a concentration of the catalyst of 0.1 mole/liter.

A stainless steel (SUS 316L) reactor with a capacity of 100 ml was charged with 22.83 g (0.1 mole) of the refined bisphenol A, 22.71 g (0.106 mole) of diphenyl carbonate and 0.03 ml (5 ppm in terms of potassium based on the weight of bisphenol A) of the polymerization catalyst solution with a catalyst concentration of 0.1 mole/liter. Air in the stainless steel reactor was removed under vacuum at room temperature for 0.5 hour, a nitrogen gas was filled in the reactor under the ambient atmospheric pressure, and then the reactor was heated to promote the condensation-polymerization reaction of diaryl carbonate with bisphenol A. The reaction mixture was heated at a temperature of 230° C. under a pressure of 100 torr for one hour after the start of distillation of phenol, at 240° C. under 100 torr for 0.5 hour, and at 255° C. under 100 torr for 10 minutes, then the pressure in the reactor was reduced from 100 torr to 50 torr in a time of 15 minutes, and the reaction mixture was further heated under these conditions for 15 minutes, and finally, the pressure was reduced from 50 torr to 0.1 torr at a temperature of 270° C. in the time of 30 minutes and the reaction mixture was further heated at 270° C. under 0.1 torr for one hour to produce a polycarbonate resin. The polycarbonate was obtained in an amount of 25.44 g with an yield of 100%.

In the above-mentioned condensation-polymerization procedures, phenol was recovered in a total amount of 17.5 ml from the polymerization system.

The polycarbonate resin obtained by the above-mentioned procedures had a logarithmic viscosity number of 0.497 dl/g determined in a concentration of 0.5 g/100 ml in $CHCl_3$ at a measurement temperature of 30° C. and a weight average molecular weight of 53,000 determined by a polystyrene-conversion method. Also, when observed by naked eye, the polycarbonate resin was substantially colorless.

Example 4

A polycarbonate resin was produced by the following procedures.
(1) Preparation and refining of diphenyl carbonate The same decarbonylation procedure as in Example 3 was applied to diphenyl oxalate for 24 hours, and the resultant liquid reaction containing diphenyl carbonate was subjected to the refining procedures as shown in FIG. 5, using a multi-step distillation column, to separate the catalyst and distil diphenyl carbonate. The refined diphenyl carbonate fraction had a degree of purity of 99.8% and was collected at a flow rate of about 220 ml/hr.

The refined diphenyl carbonate had a content of diphenyl oxalate (DPO) of 20 ppm or less, a content of phenyl parachlorobenzoate (PPCB) of 5 ppm or less, a content of phenyl benzoate (PB) of 5 ppm or less, and a content of phenyl salicylate (PS) of 5 ppm or less. Also, it was confirmed that in the refined diphenyl carbonate, the total content of Group VIII metals, for example, iron, nickel and chrominium, the total content of alkali metals, for example, sodium and potassium and the total contents of phosphorus compounds respectively do not exceed 1 ppm.
(2) Production of polycarbonate
  (Method (A)

To produce a polycarbonate resin, the same procedures as in Example 3 were carried out except that the above-mentioned refined diphenyl carbonate was used.

The resultant polycarbonate resin had a logarithmic viscosity number of 0.497 dl/g determined in a concentration of 0.5 g/100 ml in $CHCl_3$ at a temperature of 30° C. and a weight average molecular weight of 53,000 determined by the polystyrene conversion method. Also, by naked eye observation, it was confirmed that the resultant polycarbonate resin was substantially colorless.

Example 5

A polycarbonate resin was produced by the following procedures.
(1) Preparation and refining of diphenyl carbonate The same decarbonylation procedure as in Example 3 was applied to diphenyl oxalate for 24 hours, and the resultant liquid fraction containing diphenyl carbonate was subjected to the refining procedures as shown in FIG. 6, using an evaporator and a multi-step distillation column, to separate the catalyst and distil diphenyl carbonate. The refined diphenyl carbonate fraction had a degree of purity of 99.9% and was collected at a flow rate of about 220 ml/hr.

The refined diphenyl carbonate had the similar contents of impurities to Example 3.
(2) Production of polycarbonate
  (Method B)

A vessel type reactor (lined with a nickel containing alloy) was charged with 20 moles of 2,2-bis(4-hydroxy-phenyl) propane, 21 moles of the diphenyl carbonate prepared by the above-mentioned procedures and 6 ml of an aqueous solution of potassium dihydrogen phosphate (degree of purity: 99.99%) in a concentration of 0.1 mole/liter. The charged mixture was melted at a temperature of 160° C. in a nitrogen gas atmosphere and stirred for one hour, then the temperature of the melt was gradually rised to 270° C. while gradually reducing the pressure in the reactor to 1 torr, and finally, the melt was stirred at 270° C. under one torr for 4 hours, while evaporating and recovering the resultant by-product comprising phenol, to prepare a polycarbonate prepolymer. Finally, the prepolymer was subjected to a polymerization procedure in a vertical, biaxial self-cleaning type reactor at a temperature of 270° C. under a pressure of 0.1 torr for 50 minutes. A colorless, transparent polycarbonate resin having a molecular weight of about 55,000 was obtained.

In the above-mentioned condensation-polymerization procedures, phenol was recovered in a total amount of 3760 g from the polymerization system. The recovered phenol was refined by a conventional distillation procedure. The refined phenol had a total content of organic impurity of 10 ppm or less and contained substantially no other impurity.

In Examples 3 to 5, it was confirmed that the refining procedure for the diaryl carbonate contributes to enhancing the quality of the resultant polycarbonate resin.

We claim:

1. A process for producing a polycarbonate comprising the steps of:
   transesterifying a dialkyl oxalate with a hydroxyaryl compound to produce a diaryl oxalate;
   subjecting the diaryl oxalate to a decarbonylation reaction in the presence of a decarbonylation catalyst to produce a diaryl carbonate and a by-product comprising carbon monoxide;
   condensation-polymerizing the diaryl carbonate with a polyhydroxyl compound to produce the polycarbonate, while separating and collecting a by-product comprising a hyroxyaryl compound from the resultant reaction mixture; and
   supplying the hydroxyaryl compound collected in the condensation-polymerizing step to the transesterifying step.

2. The process for producing a polycarbonate as claimed in claim 1, wherein in the transesterifying step, the dialkyl oxalate is transesterfied with the hydroxyaryl compound in the presence of a transesterification catalyst, while removing a by-product comprising an alkyl alcohol corresponding to the dialkyl oxalate to the outside of the reaction system, to produce the diaryl oxalate.

3. The process for producing a polycarbonate as claimed in claim 1, wherein in the transesterifying step, the dialkyl oxalate is transesterified with the hydroxyaryl compound in the presence of a transesterification catalyst, while removing a by-product comprising an alkyl alcohol corresponding to the dialkyl oxalate to the outside of the reaction system, to produce an alkylaryl oxalate, and the resultant alkylaryl oxalate is disproportionated in the presence of the transesterification catalyst, while removing a by-product comprising a dialkyl oxalate to the outside of the reaction system, to produce the diaryl oxalate.

4. The process for producing a polycarbonate as claimed in claim 2, wherein the transesterification catalyst comprises an organic titanium Lewis acid compound.

5. The process for producing a polycarbonate as claimed in claim 3, wherein in the disproportionation of the alkylaryl oxalate, non-reacted dialkyl oxalate and hydroxyaryl compound and the resultant dialkyl oxalate produced as a by-product are recovered together or separately from the reaction system and are returned to and re-used in the transesterify step.

6. The process for producing a polycarbonate as claimed in claim 1, wherein the hydroxyaryl compound used in the transesterifying step is selected from the group consisting of phenol and substituted phenols having at least one substituent selected from the group consisting of alkyl groups having 1 to 6 carbon atoms, alkoxy groups having 1 to 6 carbon atoms, and halogen atoms.

7. The process for producing a polycarbonate as claimed in claim 1, wherein, in the decarbonylation step, the by-product comprising carbon monoxide is recovered in gas phase.

8. The process for producing a polycarbonate as claimed in claim 1, wherein the decarbonylation step is carried out in liquid phase in the presence of a decarbonylation catalyst comprising an organic phosphorous compound.

9. The process for producing a polycarbonate as claimed in claims 1, wherein the condensation-polymerizing step is carried out in the presence of a basic catalyst.

10. The process for producing a polycarbonate as claimed in claim 1, wherein the polyhydroxyl compound used in the condensation-polymerizing step is a dihydroxyaryl compound.

11. The process for producing a polycarbonate as claimed in claim 10, wherein the dihydroxyaryl compound is selected from the group consisting of bis (hydroxyaryl) alkanes, dihydroxyarylethers, dihydroxyarylsulfides, dihydroxyarylsulfoxides and dihydroxyaryl-sulfones.

12. The process for producing a polycarbonate as claimed in claim 1, wherein the condensation-polymerizing step is carried out by a melt polymerization procedure.

13. The process for producing a polycarbonate as claimed in claim 1, wherein the diaryl carbonate obtained in the dicarbonylation step is contained in a diaryl carbonate mixture, the process further comprising the steps of refining the diaryl carbonate mixture and collecting the resultant refined diaryl carbonate mixture having an increased degree of purity of diaryl carbonate, the collected refined diaryl carbonate mixture being supplied to the condensation-polymerizing step.

14. The process for producing a polycarbonate as claimed in claim 13, wherein the refining step for the diaryl carbonate mixture is effected to an extent such that the resultant refined diaryl carbonate mixture contains 2000 ppm or less of the diaryl oxalate and 95% by weight or more of the diaryl carbonate.

15. The process for producing a polycarbonate as claimed in claim 13, wherein the refining step for the diaryl carbonate mixture is carried out by a distillation procedure in which the resultant refined diaryl carbonate mixture is collected therefrom.

16. The process for producing a polycarbonate as claimed in claim 14, wherein the refined diaryl carbonate mixture contains 1000 ppm or less of the diaryl oxalate and 98% by weight or more of the diaryl carbonate.

17. The process for producing a polycarbonate as claimed in claim 1, wherein the diaryl oxalate is decarbonylated in the presence of a decarbonylation catalyst comprising an organic phosphorus compound, while removing a resultant by-product comprising carbon monoxide, to produce a diaryl carbonate mixture; the resultant diaryl carbonate mixture is subjected to a refining distillation procedure to an extent such that the resultant refined diaryl carbonate mixture contains 1000 ppm or less of the diaryl oxalate and 98% by weight or more of the diaryl carbonate; and the refined diaryl carbonate mixture is reacted with a polyhydroxyaryl compound as the polyhydroxyl compound in the condensation-polymerizing step by a melt polymerization procedure in the presence of a condensation-polymerization catalyst comprising a basic compound, while separating and collecting a resultant by-product comprising a hydroxyaryl compound.

18. The process for producing a polycarbonate as claimed in claim 17, wherein the refined diaryl carbonate mixture contains 500 ppm or less of the diaryl oxalate and 99% by weight or more of the diaryl carbonate.

19. The process for producing a polycarbonate as claimed in claim 17, wherein the refined diaryl carbonate mixture contains impurities comprising 1000 ppm or less of diaryl oxalate and 200 ppm or less of phenyl p-chlorobenzoate.

20. The process for producing a polycarbonate as claimed in claim 17, wherein the refined diaryl carbonate mixture contains impurities comprising 1000 ppm or less of diaryl oxalate, 200 ppm or less of phenyl p-chlorobenzoate, 200 ppm or less of phenyl benzoate and 200 ppm or less of phenyl salicylate.

21. The process for producing a polycarbonate as claimed in claims 17, wherein the refined diaryl carbonate mixture contains impurities comprising 500 ppm or less of diaryl oxalate, 100 ppm or less of phenyl p-chlorobenzoate, 100 ppm or less of phenyl benzoate and 100 ppm or less of phenyl salicylate.

* * * * *

UNITED STATES PATENT AND TRADEMARK OFFICE
CERTIFICATE OF CORRECTION

PATENT NO.    :   5,922,827
DATED         :   July 13, 1999
INVENTOR(S)   :   Keigo NISHIHIRA et al.

It is certified that error appears in the above-identified patent and that said Letters Patent is hereby corrected as shown below:

In Claim 5, col. 27, line 4, "transesterify" should read --transesterifying--.

In Claim 9, col. 27, line 21, "claims 1" should read --claim 1--.

In Claim 13, col. 27, line 37, "dicarbonylation" should read --decarbonylation--.

In Claim 21, col. 28, line 43, "claims 17" should read --claim 17--.

Signed and Sealed this

Twenty-second Day of May, 2001

*Attest:*

NICHOLAS P. GODICI

*Attesting Officer*          *Acting Director of the United States Patent and Trademark Office*